United States Patent
Rode

(10) Patent No.: US 8,961,090 B2
(45) Date of Patent: *Feb. 24, 2015

(54) AXLE NUT

(76) Inventor: John E. Rode, Fonda, NY (US)

( * ) Notice: Subject to any disclaimer, the term of this patent is extended or adjusted under 35 U.S.C. 154(b) by 394 days.

This patent is subject to a terminal disclaimer.

(21) Appl. No.: 12/033,548

(22) Filed: Feb. 19, 2008

(65) Prior Publication Data

US 2008/0143173 A1    Jun. 19, 2008

Related U.S. Application Data

(62) Division of application No. 11/354,513, filed on Feb. 15, 2006, now Pat. No. 7,389,579.

(51) Int. Cl.
| | | |
|---|---|---|
| *B60B 35/00* | (2006.01) | |
| *F16C 33/30* | (2006.01) | |
| *B25B 27/06* | (2006.01) | |
| *F16B 31/04* | (2006.01) | |
| *F16C 19/54* | (2006.01) | |
| *F16C 25/06* | (2006.01) | |
| *F16C 43/04* | (2006.01) | |
| *F16B 39/12* | (2006.01) | |

(52) U.S. Cl.
CPC .............. *F16C 33/30* (2013.01); *B25B 27/062* (2013.01); *F16B 31/043* (2013.01); *F16C 19/54* (2013.01); *F16C 25/06* (2013.01); *F16C 43/04* (2013.01); *F16B 39/12* (2013.01)
USPC ............ 411/248; 411/296; 411/303; 411/316

(58) Field of Classification Search
USPC ........ 411/14.5, 221, 245, 248, 432, 296, 304, 411/315, 316, 246, 247, 303, 427
See application file for complete search history.

(56) References Cited

U.S. PATENT DOCUMENTS

| | | | | |
|---|---|---|---|---|
| 3,316,952 | A | * | 5/1967 | Hollinger ....................... 411/301 |
| 3,522,830 | A | * | 8/1970 | Blizard ........................... 411/303 |
| 3,762,455 | A | * | 10/1973 | Anderson, Jr. ................ 411/190 |
| 3,844,323 | A | * | 10/1974 | Anderson, Jr. ................ 411/190 |
| 4,210,372 | A | | 7/1980 | McGee |
| 4,436,468 | A | * | 3/1984 | Ozaki et al. .................... 411/248 |
| 4,593,924 | A | * | 6/1986 | Cabeza ........................... 280/279 |
| 4,812,094 | A | * | 3/1989 | Grube ............................ 411/134 |

(Continued)

FOREIGN PATENT DOCUMENTS

DE    3905385    8/1990

*Primary Examiner* — Victor Batson
*Assistant Examiner* — Caroline L Natirboff
(74) *Attorney, Agent, or Firm* — Heslin Rothenberg Farley & Mesiti P.C.; Nicholas Mesiti, Esq.; Victor A. Cardona, Esq.

(57) ABSTRACT

An axle nut for preloading a bearing is provided. The axle nut may be used to apply and monitor preload on a bearing or bearing assembly. The axle nut includes a cylindrical body having a first end, a second end having a face adapted to bear against a surface, a longitudinal axis, and an outer surface engagable by a tool; a threaded through-hole directed substantially along the longitudinal axis of the cylindrical body; and at least one recess in the face of the second end of the cylindrical body, the at least one recess adapted to expose at least a portion of the surface the face bears against. The first end of the axle may comprise a nut locking mechanism, for example, the nut locking mechanism may include a counter bore having a plurality of internal projections, such as, gear or spline teeth.

26 Claims, 21 Drawing Sheets

(56) References Cited

U.S. PATENT DOCUMENTS

| | | | |
|---|---|---|---|
| 4,958,941 A | 9/1990 | Imanari | |
| 5,011,306 A | 4/1991 | Martinie | |
| 5,251,995 A * | 10/1993 | Chi | 403/320 |
| 5,366,300 A | 11/1994 | Deane | |
| 5,533,849 A | 7/1996 | Burdick | |
| 5,573,311 A * | 11/1996 | Clohessy | 301/105.1 |
| 5,749,386 A * | 5/1998 | Samuel, Jr. | 135/16 |
| 5,934,853 A * | 8/1999 | Junkers | 411/432 |
| 6,095,735 A * | 8/2000 | Weinstein et al. | 411/221 |
| 6,135,642 A * | 10/2000 | Burch | 384/540 |
| 6,749,386 B2 * | 6/2004 | Harris | 411/544 |
| 7,389,579 B2 * | 6/2008 | Rode | 29/724 |
| 7,927,052 B1 * | 4/2011 | Varden | 411/221 |
| 8,328,486 B2 * | 12/2012 | Cox | 411/248 |
| 2003/0035699 A1 * | 2/2003 | Harris | 411/161 |
| 2005/0025604 A1 * | 2/2005 | Slesinski et al. | 411/112 |
| 2006/0008340 A1 * | 1/2006 | Cox | 411/248 |
| 2007/0211973 A1 * | 9/2007 | Rode | 384/448 |
| 2009/0003963 A1 * | 1/2009 | Winker et al. | 411/349 |
| 2011/0097174 A1 * | 4/2011 | Varden | 411/221 |

* cited by examiner

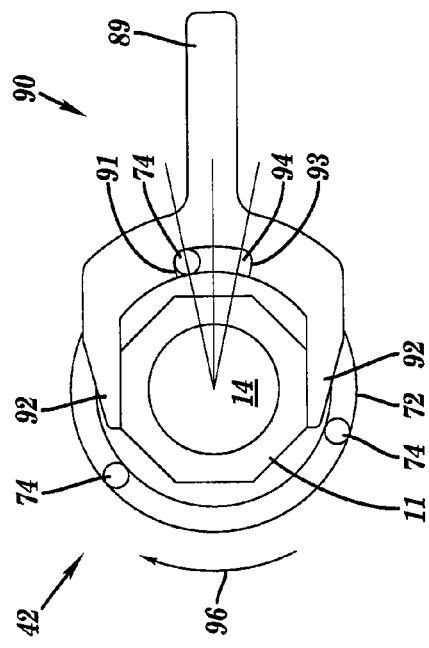
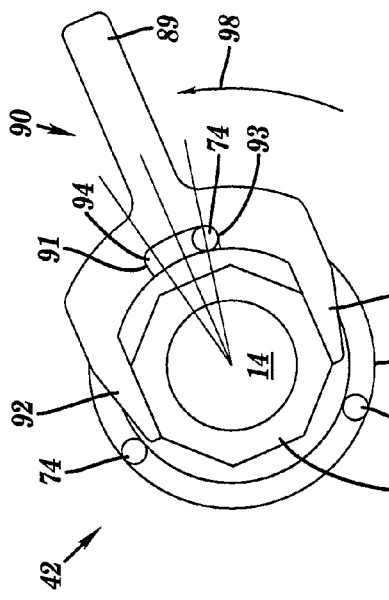
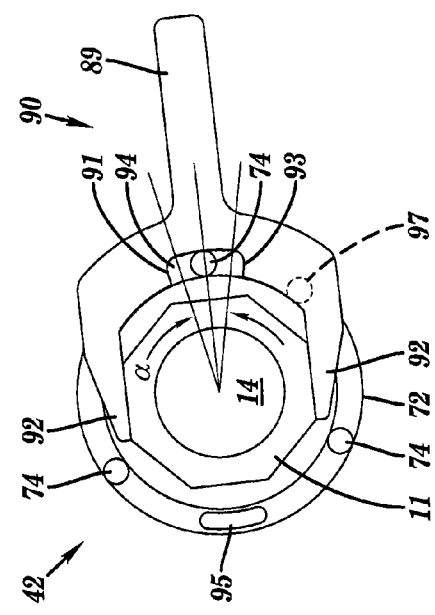

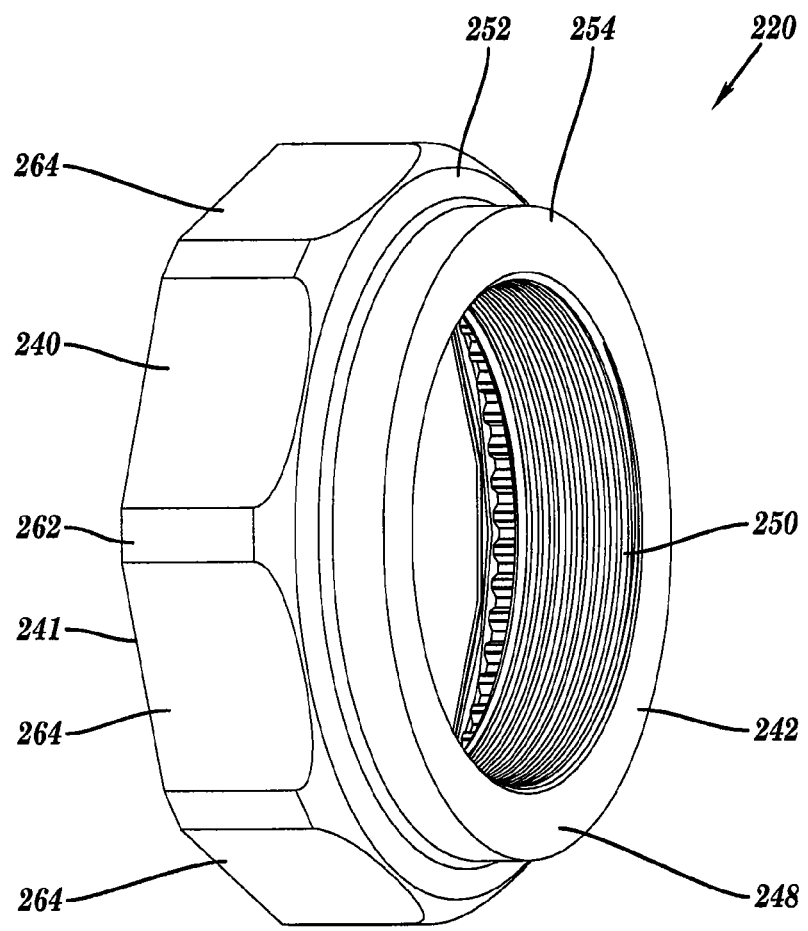
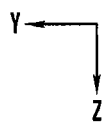
FIG. 15

AXLE NUT

CROSS-REFERENCE TO RELATED APPLICATION

This application is related to pending U.S. patent application Ser. No. 11/341,948, filed on Jan. 27, 2006, entitled "Method and Apparatus for Preloading a Bearing", the disclosure of which is incorporated by reference herein.

This application is a divisional application of U.S. application Ser. No. 11/354,513 filed on Feb. 15, 2006, now U.S. Pat. No. 7,389,579, the disclosure of which is incorporated by reference herein.

TECHNICAL FIELD

The present invention relates, generally, to methods and apparatus for preloading antifriction bearings in drive trains, particularly, to preloading and adjusting bearings while monitoring the preload being applied.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.003 inches (where this amount is the compressive deflection of the two bearings combined), which is often referred to as "a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new.

One of the popular means of adjusting bearing preload by means of an applied torque is described in the literature provided by the Stemco Company, of Longview, Tex. (for example, Stemco form 571-2970) and further in instructions provided by Stemco (for example, Stemco part number 09-571-0006). These instructions are typically packaged with Stemco's axle spindle nuts. The accuracy of this and other prior art preloading methods is limited because they rely on the relationship between assembly torque and axial preload of the bearings, which will vary with variations in torsional resistance or friction of the nut against the face of the bearing, and will also vary with variations in torsional resistance or friction of the nut against the spindle thread, the nut against the bearing face, and the aforementioned lip seal present in the assembly.

Due to the limitations and disadvantages of these and other prior art bearing preloading methods and devices, there is a need to provide accurate and repeatable procedures and devices for providing and adjusting bearing preload. Aspects of the present invention overcome the limitations and disadvantages of the prior art and provide methods and apparatus for creating known, monitorable, uniform preload that is not subject to the inaccuracies of prior art methods and devices. Moreover, aspects of the present invention are easier to apply by a mechanic.

SUMMARY OF THE INVENTION

The present invention provides improved methods and apparatus for preloading bearings. In particular, the methods and apparatus of the present invention permit the mechanic to monitor the preload during the preloading procedure to more accurately determine the actual preload provided. One aspect of the invention is an apparatus for providing a preload on a bearing, the bearing having an inner race mounted to a shaft and an outer race mounted in a hub, the apparatus including a rod having a first end and a second end adapted to be removably mounted to the shaft; means for compressing the hub against the outer race of the bearing to provide the preload to the bearing, the means for compressing mounted to the rod; and a cylindrical frame positioned between the means for compressing the hub and the hub, the cylindrical frame having a first end adapted to receive a load from the means of compressing the hub and a second end adapted to transmit the load to the hub. In one aspect, the second end of the cylindrical frame contacts the hub. In another aspect, the second end of the cylindrical frame contacts an inner race of a bearing. In another aspect, the apparatus further comprises means for monitoring the preload on the bearing Another aspect of the invention is a method for providing a preload on a bearing having an inner race mounted to a shaft and an outer race mounted in a hub, the method including mounting a rod to an end of the shaft; mounting a means for compressing the hub against the outer race of the bearing to the rod; and actuating the means for compressing the hub to compress the hub against the outer race of the bearing to provide the preload to the bearing. In one aspect, the method further comprises monitoring the preload on the bearing.

Another aspect of the invention is an apparatus for providing a preload to an inboard bearing having an inner race mounted to a shaft and an outer race mounted in a hub and for providing a preload to an outboard bearing having an inner race mounted to the shaft and an outer race mounted in the hub, the outboard bearing spaced from the inboard bearing, the apparatus including an outboard bearing retaining nut adapted to engage a threaded end of the shaft and contact the inner race of the outboard bearing to retain the preload on the outboard bearing; a rod having a first end and a second end adapted to be removably mounted to the shaft; a fluid-containing cylinder mounted to the rod, the cylinder having a cylinder housing mounted to the rod and a piston adapted to compress the hub against the outer race of the inboard bearing to provide the preload to the inboard bearing; an actuating nut threaded to the rod and adapted to compress the cylinder housing toward the piston; and a cylindrical frame positioned between the piston and the hub having a first end adapted to receive a load from the piston and a second end adapted to transmit the load to the hub and compress the hub against the inner race of the inboard bearing to provide the preload to the inboard bearing. In one aspect, the apparatus further comprises means for monitoring the pressure of the fluid in the fluid-containing cylinder.

A further aspect of the invention is an apparatus for precisely rotating a nut, the apparatus including a guide frame comprising a support ring having a first side adapted to contact a support and a second side opposite the first side; and a plurality of posts having first ends mounted to the second side of the support ring and second ends opposite the first ends; and a tool comprising a set of opposed tines adapted to engage flats on the nut; means for rotating the tines to rotate the nut; and at least two spaced stops adapted to engage at least one of the posts of the guide frame and limit the rotation of the nut to the predetermined angle defined by the two spaced stops.

A still further aspect of the invention is a method for precisely rotating a nut, the method including determining a desired precise rotation for the nut; providing a guide frame comprising: a support plate having a first side adapted to contact a support and a second side opposite the first side; and a plurality of spaced stops positioned on the support plate; providing a tool comprising: at least one set of opposed tines adapted to engage flats on the nut; and a plurality of spaced stops adapted to engage at least one of the spaced stops of the guide frame, the spaced stops positioned to limit the rotation of the tool to the desired precise rotation for the nut; mounting the tool to the nut wherein the plurality of tines engage flats on the nut and wherein the at least one stop on the tool engages at least one stop on the guide frame; and rotating the nut with the tool wherein at least one stop on the tool engages at least one stop on the guide frame wherein the nut is rotated the desired precise rotation.

A further aspect of the invention is a tool for precisely rotating a nut, the tool including: at least one set of opposed tines adapted to engage flats on the nut; means for rotating the plurality of tines to rotate the nut; at least one stop adapted to engage at least corresponding stop on a fixture mounted adjacent the nut to limit the rotation of the nut to a predetermined angle. In one aspect, the at least one stop on the tool comprises at least one of a post, pin, and recess.

A further aspect of the invention is an axle nut comprising a cylindrical body having a first end, a second end having a face adapted to bear against a surface, a longitudinal axis, and an outer surface engagable by a tool; a threaded through-hole directed substantially along the longitudinal axis of the cylindrical body; and at least one recess in the face of the second end of the cylindrical body, the at least one recess adapted to expose at least a portion of the surface the face bears against. In one aspect, the at least one recess comprises at least one arcuate recess, for example, a plurality of arcuate recesses equally spaced about the perimeter of the face.

Another aspect of the invention is an apparatus for providing a load on a bearing, the bearing having an inner race mounted to a shaft and the bearing retained on the shaft by a nut, the apparatus comprising a rod having a first end and a second end adapted to be removably mounted to the shaft; an adapter comprising a plate having a hole through which the rod passes and a plurality of extensions mounted to the plate and adapted to engage the inner race of the bearing with the nut in place; and means for providing a compressive load to the plate of the adapter whereby the load is provided to the inner race of the bearing with the nut in place. In one aspect, the plurality of extensions is pivotally mounted to the plate. In another aspect, the apparatus further comprises means for monitoring the load on the bearing.

A further aspect of the invention is a method for providing a load on a bearing having an inner race mounted to a shaft and the bearing retained on the shaft by a nut, the method comprising mounting a rod to an end of the shaft; without removing the nut, mounting a means for compressing the inner race of the bearing to the shaft; and actuating the means for compressing the inner race to compress the inner race to provide the load to the bearing. In one aspect, the means for compressing the inner race comprises an adapter having a plate and a plurality of extensions mounted to the plate, wherein mounting the means of compressing comprises mounting the adapter to the rod and the inner race.

A still further aspect of the invention is a fastener arrangement for retaining a bearing on a shaft, the bearing having an inner bearing race having an outer diameter, the fastener arrangement adapted to permit a bearing loading device to contact the inner bearing race, the fastener arrangement comprising a first threaded ring adapted to threadably mount to the shaft and engage the inner bearing race, the first threaded ring having an outer diameter less than the outer diameter of the inner bearing race and an outer surface engagable by a tool; a second ring adapted to mount to the shaft and engage the first ring and engage the shaft to prohibit relative movement between first ring and the shaft; and a third threaded ring adapted to threadably mount to the shaft and to contact the second ring, the third ring having an outer surface engagable by a tool; wherein when the first ring, second ring, and third ring are mounted to the shaft, the bearing is retained on the shaft and the inner bearing race is exposed and can be contacted by the bearing loading device. In one aspect, at least one of the first threaded ring and the third threaded ring comprises a threaded nut.

An even further aspect of the invention is a method for providing a load to a bearing having an inner race mounted to a threaded shaft, the inner race having an outer diameter, the method comprising threading a first threaded ring onto the threaded shaft whereby the threaded ring contacts the inner bearing race, the first threaded ring having an outer diameter less than the outer diameter of the inner; mounting a second ring to the shaft, the second ring adapted engage the first ring and engage the shaft to prohibit relative movement between first ring and the shaft; and threading a third threaded ring on to the shaft, the third threaded ring adapted to engage the second ring; and engaging the inner race with an apparatus adapted to provide the load to the inner race. In one aspect, the method further comprises monitoring the load on the inner race. In another aspect, the method further comprises, when the load on the inner race reaches about a predetermined load, tightening the first threaded ring against the inner race, for example, to maintain the predetermined load on the inner race.

These and other aspects, features, and advantages of this invention will become apparent from the following detailed description of the various aspects of the invention taken in conjunction with the accompanying drawings

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIGS. 6A, 6B, and 6C are partial axial elevation views of another aspect of the invention as viewed along the section lines 6-6 shown in FIG. 4 with the addition of a typical tool according to one aspect of the invention.

FIG. 15 is a perspective view of an axle nut according to another aspect of the invention.

DETAILED DESCRIPTION OF THE INVENTION

Figure 1:
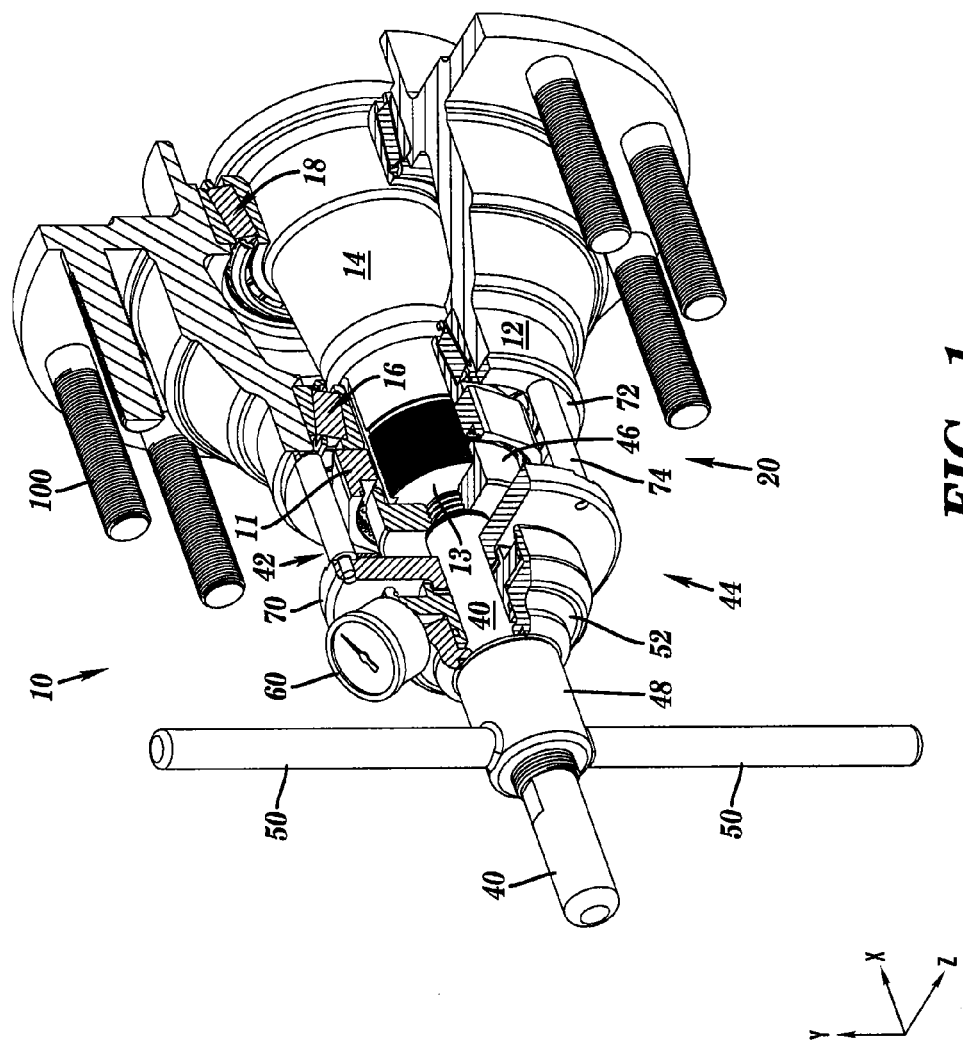
FIG. 1 is perspective view of a wheel hub assembly having a bearing preloading apparatus according to one aspect of the invention.
Figure 2:
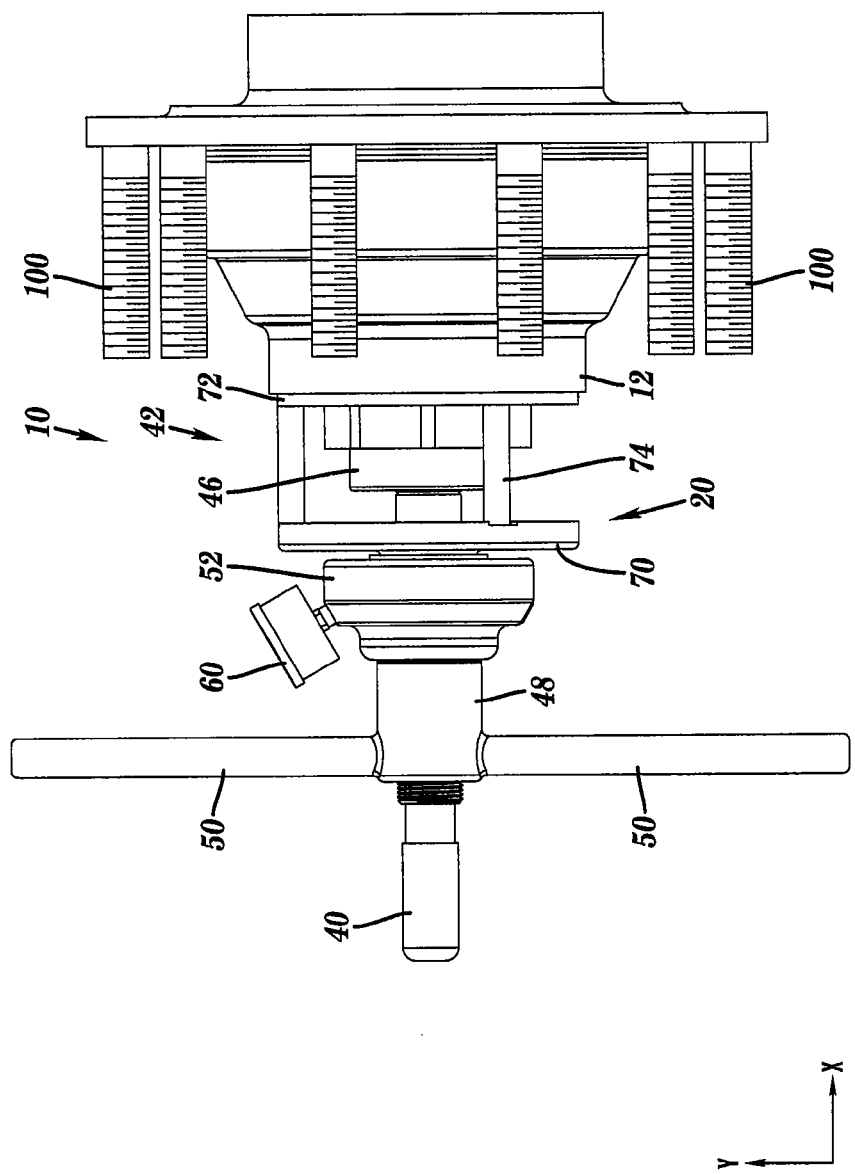
FIG. 2 is a right side elevation view of the hub assembly shown in FIG. 1.
Figure 3:
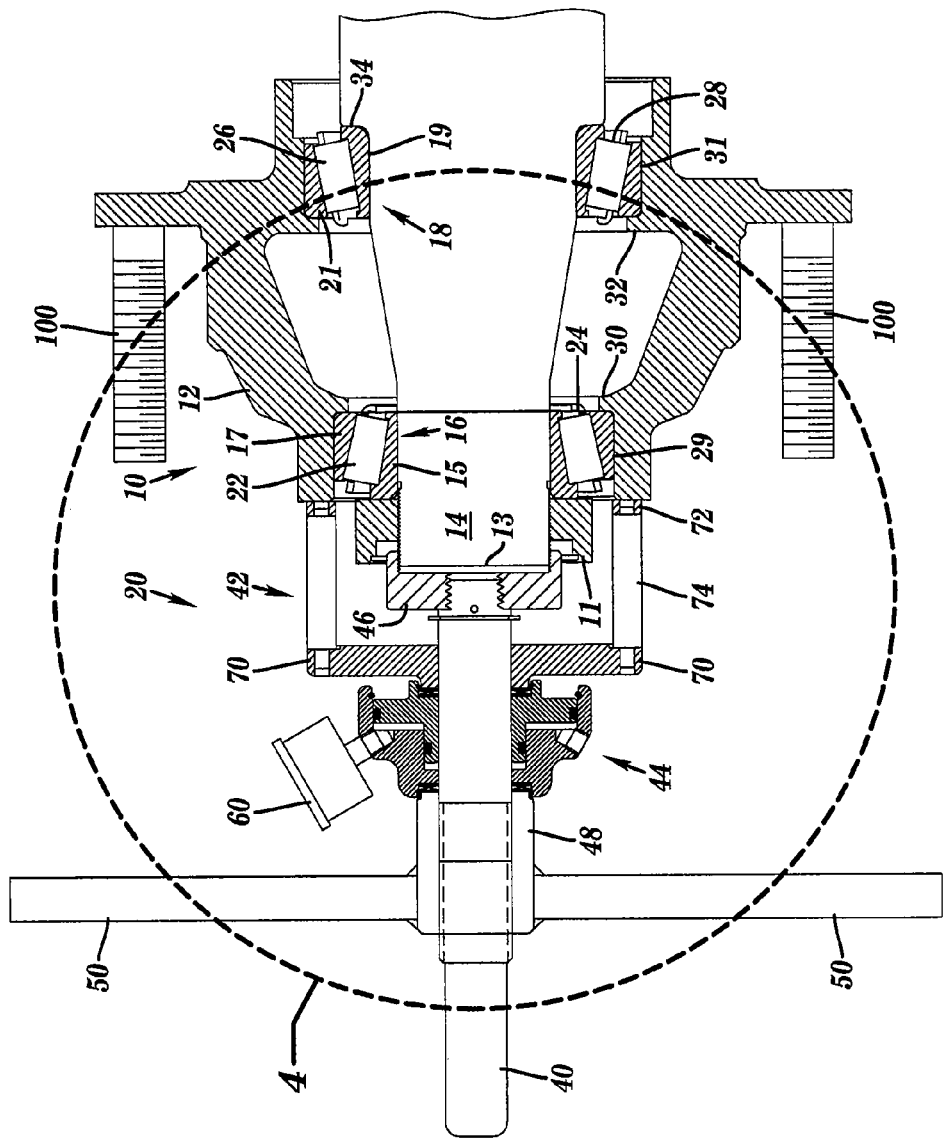
FIG. 3 is a right side elevation view, partially in cross section, of the assembly shown in FIG. 1

FIG. 1 is perspective view of a wheel hub assembly 10 having a bearing preloading apparatus 20 according to one aspect of the invention. In FIG. 1, some of a section of the hardware has been removed to reveal inner structure to facilitate disclosure of the invention. FIG. 2 is right side elevation view of the wheel hub assembly 10 and preload apparatus 20 shown in FIG. 1. FIG. 3 is a right side elevation view, partially in cross section, of the assembly shown in FIG. 1. For the sake of illustration, the wheel assembly that would typically be mounted to wheel hub assembly 10 is omitted. Wheel hub assembly 10 represents a typical wheel hub that may be found on any wheeled vehicle, for example, a wheel hub of truck, a front or rear axle of a tractor of a tractor-trailer, or an axle of a trailer.

The wheel hub assembly 10 shown in FIG. 1 is an assembly that would typically be found on a front or rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: power trains, transmissions, machine components, on and off-road vehicles, aircraft wheels, marine drives, spacecraft, conveyor rolls, and windmills, among others. According to aspects of the present invention, preloading apparatus 20 may be used in these and any other assembly for which bearing preload and/ or endplay is desired, for example, any assembly that utilizes thrust and radial load carrying bearings that are indirectly mounted.

As shown in FIGS. 1 and 3, typical wheel hub assembly 10 includes a wheel hub or, simply, a hub 12, a threaded shaft, axle, or "spindle" 14. As is typical, on spindle 14 are mounted two antifriction bearings 16 and 18 and spindle 14 includes an exposed end 13, which is typically threaded. Spindle 14 typically includes a retaining nut 11 threaded to the exposed end 13. Retaining nut 11 may comprise the locking nut disclosed in commonly owned copending U.S. application Ser. No. 11/029,531 filed on Jan. 5, 2005, the disclosure of which is incorporated by reference herein, or any other available retaining nut. In the conventional art, retaining nut 11 typically is used to secure a wheel (not shown) or hub assembly to a non-rotating axle 14. However, in aspects of the present invention, retaining nut 11 may be useful in varying the preload and/or endplay of bearings 16 and 18. Though bearings 16 and 18 are illustrated as tapered roller bearings, aspects of the invention may be applied to other types of antifriction bearings for which it is desirable to provide preload and/or endplay, for example, spherical roller bearings, deep groove ball bearings, and the like. In the following discussion and claims, bearing 16 may be referred to as the "outboard bearing" and bearing 18 may be referred to as the "inboard bearing."

As shown in FIG. 3, as is typical of bearings, outboard bearing 16 includes an inner race (or cone) 15, an outer race (or cup) 17, a plurality of rollers 22, and a roller cage 24. Similarly, inboard bearing 18 includes an inner race (or cone) 19, an outer race (or cup) 21, a plurality of rollers 26, and roller cage 28. As shown in FIG. 3, the outer race 17 of outboard bearing 16 is positioned, for example, an interference fit, into a annular cavity 29 having a annular retaining flange 30. Similarly, the outer race 21 of inboard bearing 18 is positioned into an annular cavity 31 having a retaining flange 32. Also, the inner race 15 of outboard bearing 16 is positioned, for example, a sliding fit, onto the outside diameter of spindle 14 and the inner race 19 of inboard bearing 18 is positioned against a shoulder 34 of spindle 14, which may be a sliding or interference fit to the spindle diameter. As such, any loads applied to hub 12 or spindle 14 are transferred to inboard bearing 18.

According to some teachings in the art, outboard bearing 16 and inboard bearing 18 can be provided with at least some preload to enhance the performance or bearing life and the performance or life of wheel hub assembly 10. For example, as described in the Timken Tech Tip, Volume 6, Issue 3 (copyrighted 2001) entitled "Preload in Wheel Bearings" [http://www.timken.com/products/bearings/techtips/PDFs/Vol6No3.pdf#search='Bearing%20Preload'], > Slight preload [on wheel bearings] can improve bearing, seal, and tire life, but only if the entire process is in control. "In control" means that you actually know the bearing setting process will result in a consistent bearing setting range.

The Tech Tip continues,

> Unfortunately, neither dial indicators nor any other standard tool will tell a technician the amount of preload in a wheel end . . . . To date, there isn't anything available that will confirm that the bearing fastener is providing the correct preload setting." [Emphasis added.]

In other words, one of the leading bearing suppliers in the world believes that conventional torquing methods and dial indicator methods have proven to be unsatisfactory means of providing preload and endplay. Specifically, prior art methods have been shown to provide unreliable and non-repeatable preloads and/or end play to bearings such as bearings 16 and 18. Moreover, such experts in the field contend that "there isn't anything available" that can confirm a bearing preload. However, the preload assembly 20 according to aspects of the present invention provides such a device—a reliable, accurate, and repeatable means of providing preload and/or end-play adjustment to bearings such as bearings 16 and 18. In addition, aspects of the invention provide means for monitoring the preload on the bearings to, for example, ensure that the desired preload is provided, in contrast to the unreliable and often inaccurate assumed preloading of the prior art.

As shown in FIGS. 1-3, preload assembly 20 includes a rod or shaft 40 mounted for rotation within a housing or frame 42, and a means 44 for compressing hub 12 against the outer race 21 of inboard bearing 18, in which the means 44 for compressing is mounted to rod 40. Means 44, through housing 42 and hub 12, provides a known and predetermined preload to bearing 18. Housing 42 may be referred to as "the shoe" or "the foot" of preload assembly 20. Rod 40 is adapted to attach to the exposed end 13 of shaft 14, for example, by means of collar 46, though other attachment means may be used. Means 44 may be mounted to rod 40 by means of adjustment nut 48 which may be threaded to rod 40 and provide a compressive load to means 44. Nut 48 may be adapted to facilitate rotation of nut 48, for example, nut 48 may include arms 50 or a hand wheel that can assist a mechanic while manually tightening or untightening nut 48. In one aspect, nut 48 may be adapted to be rotated by an automated tool, for example, a drill or stepper motor. For instance, nut 48 may be fashioned with a hex head or threads to engage an automated tool, for example, a torque motor. One such automated tool is disclosed in FIG. 7, discussed below.

Means 44 may be any means that is adapted to transfer the compressive load provided by nut 48 to hub 12 and outer bearing race 21 of bearing 18. In one aspect, means 44 may simply comprise an extension of housing 42 whereby nut 48 contacts and compresses housing 42 against hub 12, though, absent a means to monitor the load transmitted, such a system would not be as advantageous as other aspects of the invention. In another aspect of the invention, means 44 is not only adapted to transfer a load from but 48 to outer race 21, but means 44 also provides a means for monitoring the compressive load transferred, for example, some means of direct or indirect indication of the load transferred to outer race 21, that is, the preload on bearing 18.

In one aspect of the invention, the indication of the compressive load transferred through means 44 may be provided mechanically, for example, by means of compression springs having a known spring constant, for example, coil springs or disc springs, and a deflection indicator, for example, a dial indicator, as is known in the art. In this aspect, the dial indicator may be mounted to detect and indicate the compression of one or more springs positioned in means 44 due to the advancement of nut 48, and the compression load calculated from the deflection indicated and the known spring constant of the springs used. This aspect of the invention may provide a reliable and repeatable means for monitoring the preload provided to bearing 18.

In another aspect of the invention, means 44 may provide an indication of the compression load transferred by nut 48 electronically, for example, by means of a load or pressure sensor, for instance, one or more strain gages or load cells positioned in means 44. In this aspect of the invention, the load sensor may be wired to an appropriate processor and display to, for example, provide a digital readout of the compressive load to the mechanic operating preload device 20. The transmission of signals from the sensor may also be practiced wirelessly, for example, by means of an RF signal. This aspect of the invention may also provide a reliable and repeatable means for monitoring the preload provided to bearing 18.

Figure 7:
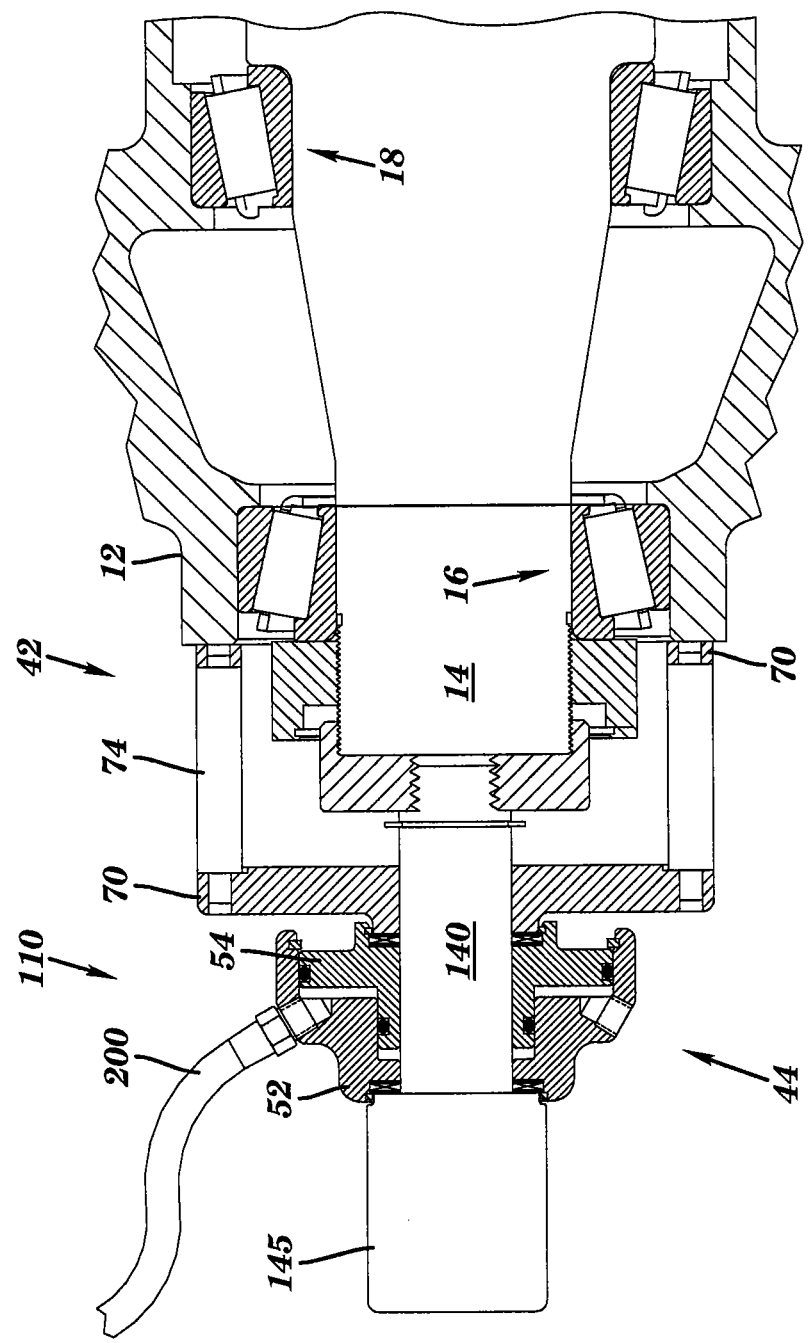
FIG. 7 is a right side elevation view, partially in cross sectional, of another aspect of the invention.

In another aspect of the invention, means 44 may include at least one fluid, for example, a gas, such as air; or a liquid, such as, water, oil, or hydraulic fluid, the pressure of which can be detected and monitored, for example, by means of a pressure gage, pressure sensor, or a mechanical indicator. In one aspect, the fluid pressure may comprise the source of compressive load on bearing 18. One apparatus that may be used to effect this aspect of the invention is shown in FIG. 7. The fluid may be retained in a cavity for example, a deformable cavity, such as a bladder or hose, for example, an air spring; or a cavity having rigid walls and at least one moveable wall, for example, as in a cylinder and piston. In one aspect, the deformable cavity or air spring may be made of molded rubber, somewhat like an inner tube, and the configuration of means 44 may be adapted accept the molded rubber when inflated and deflated.

Figure 4:
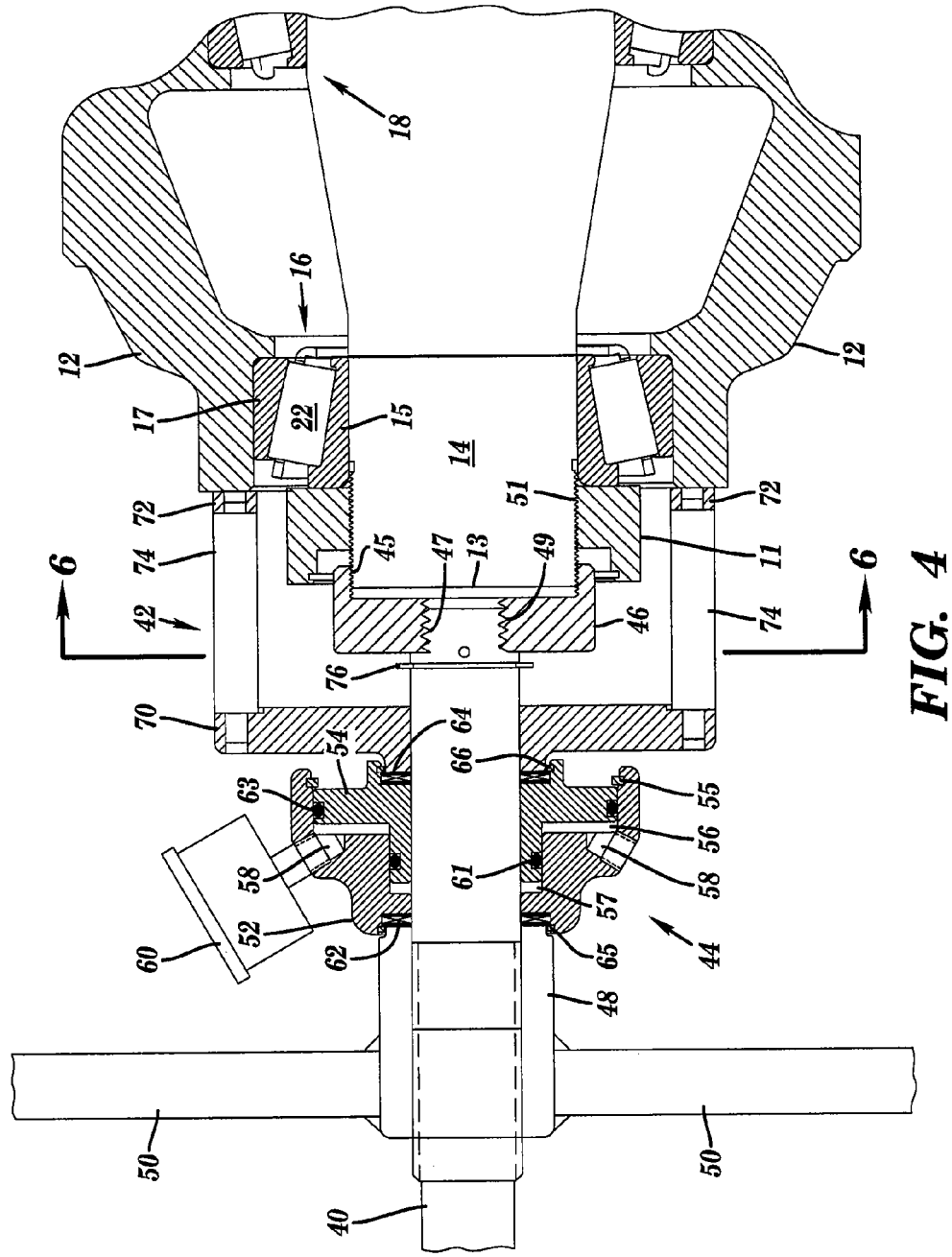
FIG. 4 is a detailed view of the means for providing a preload shown in FIG. 3 and identified by detail 4.

When air is used as the fluid, the air may be provided by conventional "shop air" at a pressure of about 100 psig. The pressure of the fluid in the deformable cavity may be monitored by means of sensor or pressure gage, for example, a pressure gas mounted to a nozzle inserted the wall of the deformable or non-deformable cavity. In one aspect, a mechanical indicator may be activated, for example, a lever deflected when the desired fluid pressure in means 44 is reached advising the mechanic. One aspect of the invention having a means 44 having a fluid is illustrated in FIGS. 1-3. FIG. 4 is a detailed view of the means 44 for providing a preload shown in FIG. 3 and identified by detail 4.

In the aspect of the invention shown in FIG. 4, means 44 comprises a housing 52 and a movable piston 54 mounted for axial movement in housing 52. In this aspect of the invention, an internal cavity 56 is provided in housing 52 between the between housing 52 and piston 54, for example, an annular cavity. Internal cavity 56 is at least partially filled, for example, substantially completely filled, with a fluid, for example, a gas, air, oil, water, and the like, that produces a hydrostatic pressure, P, when housing 52 is compressed by the advancement of nut 48 on rod 40. Piston 54 may be provided with one or more seals 61 and 63, for example, one or more wiper seals, to minimize or prevent the leakage of fluid from cavity 56. Also, housing 42 may include an internal cavity 57, which provides clearance for the displacement of piston 54 within housing 52. In one aspect, a leakage path through housing 52 may be provided from cavity 57 to minimize or prevent buildup of fluid in cavity 57 which may interfere with the proper operation of piston 54. Piston 54 may also be retained in housing 52 by means of a retainer or snap ring 55. Housing 52 and piston 54 may be fabricated by machining from solid bar or plate stock, welded from bar or plate, forged, or cast.

As shown in FIG. 4, the compressive load applied by the advancement of nut 48 is transmitted to housing 52, to the fluid in cavity 56, to piston 54, to cylindrical housing 42, to hub 12, and ultimately to the outer race 21 of bearing 18. Thus, according to aspects of the invention, the hydrostatic pressure induced in the fluid in the cavity 56 by the advancement of nut 48 provides a direct indication of the preload on bearing 18.

In one aspect, the pressure P in cavity 56 may be monitored, for example, continuously, by means of a pressure sensor or pressure gage. As shown in FIG. 4, pressure P in cavity 56 may be monitored by one or more pressure indicators 60 which is adapted to detect the pressure P in cavity 56 via a passage 58 in housing 52. Pressure indicator 60 may be an analog or digital pressure gage. Pressure indicator 60 may be a pressure sensor adapted to detect the pressure P in cavity 56 and forward an electrical signal corresponding to the pressure P to a processor or controller adapted to display the pressure, record the pressure, energize a circuit in response to the pressure, and/or provide a signal to the mechanic, for example, a tone or bell that a pressure corresponding to a desired preload on bearing 18 has been achieved.

According to aspects of the invention, the pressure P and the corresponding geometry (for example, the inside and outside diameters of cavity 56) may be used by a mechanic to determine the preload on bearing 18. For example, for a desired preload L (in pounds, Newtons) and a given area of piston 54 exposed to pressure P (in square inches, square meters), the desired pressure of the fluid in cavity 56 may be determined by the equation P=L/A, for example, in psi or Pascal. For example, when a preload of 6000 pounds lbs. (L) is desired to provide an compressive deflection of 0.003 inches on bearing 18, and the outside diameter of annular cavity 56 is 3 inches and the inside diameter of cavity 56 is 1 inch, the target pressure, P, is calculated by $$P=L/A=(6000 \text{ lbs})/((\pi/4)(3^2-1^2))=6000 \text{ lbs}/(2\pi \text{ in}^2)$$
$$=955 \text{ psig.} \qquad \text{Equation 1}$$

This pressure may now be used as the target pressure in cavity 56 and detected by pressure indicator 60 to provide the desired 0.003-inch compressive deflection for bearing 18. According to aspects of the present invention, the pressure of the fluid in cavity 56 may be monitored to determine when the desired pressure P is achieved wherein the desired preload is provided to bearing 18.

In one aspect of the invention, one or more antifriction bearings may be provided for means 44. For example, in one aspect, one antifriction bearing 62 may be positioned between nut 48 and housing 52 and another antifriction bearing 64 may be located between piston 54 and housing 42. Bearings 62 and 64 may be roller-type bearings or reduced friction material bearings. For example, bearings 62 and 64 may comprise needle bearings or a material containing at least some PTFE, for example, DuPont's Teflon® PTFE or Saint-Gobain's Rulon® PTFE, or their equivalent. Bearings 62 and 64 may be retained by one or more retaining devices 65 and 66, for example, one or more snap rings.

As shown in FIGS. 1-4, housing or frame 42 is adapted to transmit the compressive load provided by the advancement of nut 48 to hub 12. In one aspect, housing 42 may be any structure adapted to transmit this load while not interfering with the movement and operation of nut 11 and collar 46. In one aspect, housing or frame 42 comprises a cylindrical housing and may include at least one opening to permit access to nut 11 and collar 46, for example, for servicing by a mechanic. In the aspect of the invention shown in FIGS. 1-4, housing 42 comprises an upper flange 70 adapted to receive the force transmitted by means 44, a lower plate or ring 72 adapted to transmit a load to hub 12, and a plurality of posts 74 spaced about flange 70 and ring 72 to transmit a load between flange 70 and ring 72. In one aspect, flange 70 may be any plate adapted to engage piston 54 and posts 74. Ring 72 may be any annular plate adapted to receive a load from posts 74. In one aspect, the interface between ring 72 and hub 12 may be provided with an antifriction bearing, for example, a needle bearing or a PTFE-containing material, as described above with respect to bearings 62 and 64. Posts 74 may comprise cylindrical posts, for example, circular cylindrical or rectangular cylindrical, extending from flange 70 to ring 72. When housing 42 is provided as a cylindrical body, posts 74 may comprise sections of the cylindrical body remaining when openings are introduced to the cylindrical body. In one aspect, ring 72 may be omitted wherein posts 74 contact the surface of hub 12 directly. When ring 72 is omitted, posts 74 may be provided with means to reduce friction between the ends of post 74 and hub 12. For example, the ends of posts 74 may be adapted to provide antifriction bearings or rollers or reduced friction materials, such as, a PTFE-containing material. Housing 42 may be machined from stock shapes, assembled by means of fasteners, fabricated by welding, forging, casting, or a combination thereof.

In one aspect of the invention, housing or frame 42 may be adapted to contact the inner race of outboard bearing 16, that is, instead of contacting hub 12, and transmit a preload to bearing 18. For example, with reference to FIG. 3, in some wheel hub assemblies 10, the diameter of retaining nut 11 may be smaller than the diameter of inner race 15 of outboard bearing 16 whereby access to inner race 15 is not obstructed by nut 11. (In FIG. 3, the diameter of nut 11 is greater than the diameter of inner race 15 and thus inner race 15 cannot be directly accessed.) Under this condition, housing 42 may be sized or adapted to contact the inner race 15 whereby the compression load providing by advancing nut 48 may be transmitted to outboard bearing 16 via inner race 15 and from bearing 16 to hub 12 and to outer race 21 of inboard bearing 18. That is, according to one aspect of the invention, a preload may be transferred to inboard bearing 18 by means of compression on the face of hub 12 or on the inner race 15 of bearing 16. In one aspect, compressive deflection is imposed on both of bearings 16 and 18.

According to aspects of the invention, the compressive load transmitted to the bearing 18 is transmitted through hub 12. Therefore, at least some of the compressive deflection provided by the present invention will comprise deflection of hub 12. Therefore, in some aspects of the present invention, when determining the compressive deflection of bearing 18 under preload, the deflection of hub 12 may also be considered. For example, a dial indicator mounted on, for example, housing 42 to detect the compression deflection of bearing 18 may also detect the deflection of hub 12, depending upon the magnitude of the load and the stiffness of hub 12. In one aspect of the invention, when deflection of hub 12 may effect the compressive deflection, the deflection measured can be normalized to or compensated for the hub stiffness, that is, hubs of varying stiffness may have varying deflections though the corresponding compressive deflection of bearing 18 will be substantially the same. However, any deflection of hub 12 will likely have little effect upon the compressive force transmitted to bearing 18.

Figure 5:
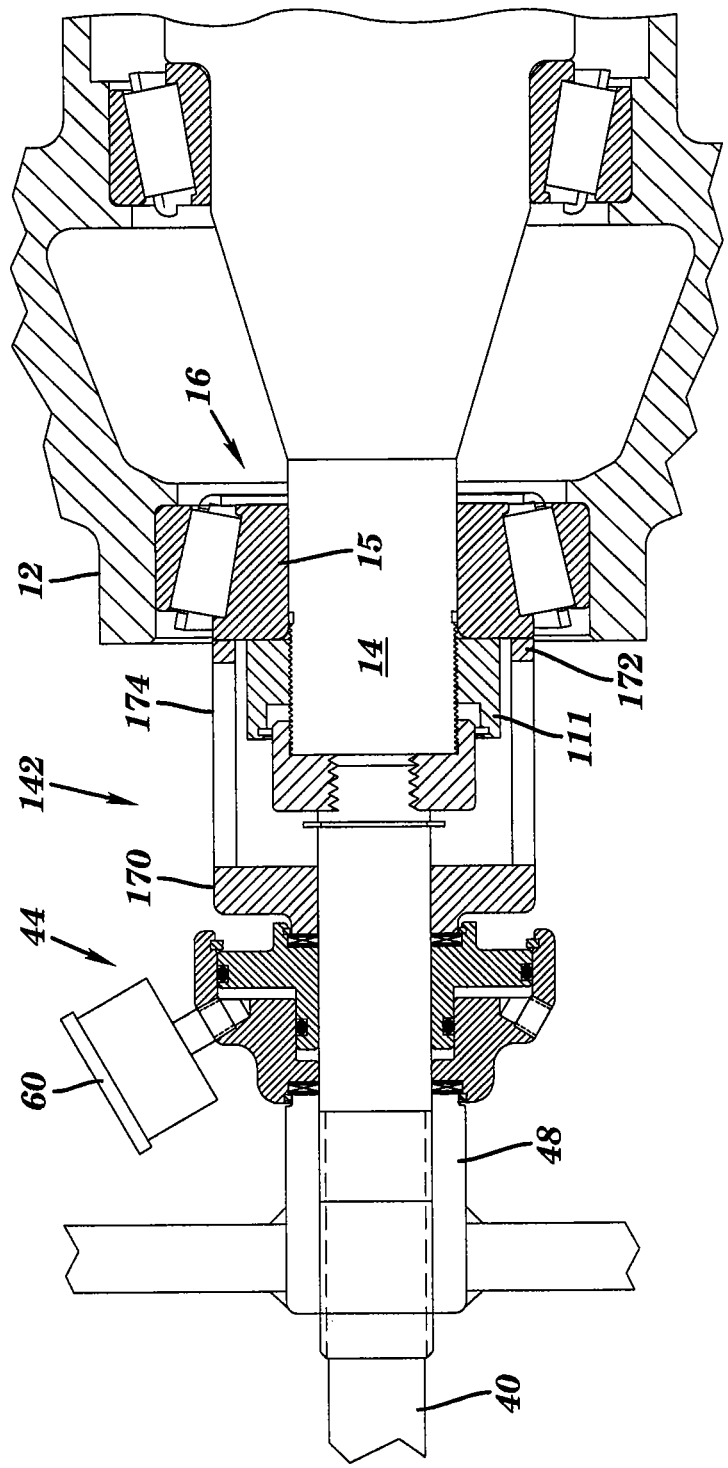
FIG. 5 is a partial cross sectional view of another aspect of the invention for transferring a load to a bearing.

It will be apparent to those of skill in the art that the design of housing 42 may be modified whereby housing 42 may contact inner race 15. For example, flange 70 and ring 72 may be reduced in diameter whereby ring 72 may contact inner race 15. This alternative aspect of the invention is shown FIG. 5. FIG. 5 illustrates a partial cross sectional view of an alternate design of housing 42 for transferring the compressive load from means 44 to bearing 18 via inner race 15 of outboard bearing 16. In this aspect, the size of nut 111 on spindle 14 is smaller than nut 11 shown earlier, whereby an inner race 15 is exposed and can be contacted by a modified housing 142. Inner race 15, bearing 16, and hub 12 are shown in FIG. 5 for reference. In this aspect of the invention, the diameter of upper flange 70 is reduced to the diameter of upper flange 170 shown in FIG. 5, the diameter of ring 72 is reduced to the diameter of ring 172 shown in FIG. 5, and posts 74 are replaced with posts 174. As a result, the compressive load can be transferred to inner race 15 of bearing 16. In another alternative design of housing 42, posts 74 may be angled or tapered inward toward the centerline of the assembly and the diameter of ring 72 reduced accordingly whereby ring 72 may contact inner race 15. Other modifications to housing 42 to achieve this contact with inner race 15 will be apparent to those of skill in the art.

As discussed previously, rod 40 is adapted to attach to the exposed end 13 of spindle 14. Though this may be effected by many conventional means, including welding and mechanical fasteners, in the aspect of the invention shown in FIGS. 1-4, rod 40 is attached to end 13 of spindle 14 by means of a collar 46. In the aspect shown, collar 46 is mounted to rod 40 by means of internal threads 47 in collar 46 that thread onto external threads 49 on rod 40. Collar 46 also includes a second set of internal threads 45 that engage external threads 51 on spindle 14. In one aspect, only 2 or 3 external threads 51 need be engaged by collar 46. According to one aspect, multiple collars 46 having varying diameters may be provided to accommodate varying diameters of spindle 14. Each of these collars 46 may be adapted to engage external threads 49 on rod 40. In one aspect, the movement of rod 40 may be limited by a collar or ring 76, for example, a snap ring, mounted on rod 40.

Rod 40, housing 42, collar 46, nut 48, arms 50, housing 52, piston 54, and housing 42 may be fabricated from any conventional structural metal, for example, iron, steel, stainless steel, aluminum, titanium, nickel, magnesium, brass, or bronze, among others.

In one aspect of the invention, apparatus 20 may be used to apply and monitor a preload to inboard bearing 18. In a typical procedure, the wheel (not shown) mounted to hub assembly 10, for example, mounted to studs on hub 10, as exemplified by stud 100 in FIG. 3. As shown in FIG. 4, apparatus 20 may be prepared by assembly and filling cavity 56 with a fluid, for example, oil, through one of the access ports 58 that is not occupied by pressure indicator 60. Nut 11 may be loosened or hand tightened prior to mounting apparatus 20, though any light load on nut 11 will typically be relieved with application of tension to spindle 14 by means of rod 40. Apparatus 20 is then mounted to hub assembly 10 by attaching rod 40 to spindle 14 by means of collar 46. As a result, housing 42 is brought into contact with hub 12. Assuming a desired compressive deflection for bearing 18, for example, 0.003 inches, and a corresponding preload, L, the desired target pressure in cavity 56 can be calculated by Equation 1.

The loading of bearing 18 is initiated by advancing, that, is tightening, nut 48, against housing 52 via bearing 62, for example, by means of arms 50. The build up of pressure in cavity 56 as indicated by pressure indicator 60 may be monitored by the mechanic. The tightening of nut 48 continues until the target pressure is achieved. The hub assembly may be rotated at least once to provide proper seating of the rollers in bearing 18. Once the target pressure is achieved in cavity 56, and the desire preload is applied to bearing 18, nut 11 may be tightened against inner race 15 to maintain the preload after apparatus 20 is removed. The desired tightening of nut 11 may be determined by monitoring the pressure in cavity 56 on pressure indicator 60. For example, should the pressure begin to decrease during tightening of nut 11, the nut may be tightened too much. The reduction in pressure means that the preload on bearing 18 is being relieved and transferred to nut 11 by the tightening of nut 11. In one aspect of the invention the tightening of nut 11 can proceed until a decrease in pressure is observed. At that point, the tightening of nut 11 may be stopped, or nut 11 may be untightened slightly, for example, about ⅛ turn. Again, the hub assembly may be rotated at least once to provide proper seating of the rollers in bearings 16 and 18. Upon completion of the preloading, apparatus 20 may be removed from wheel hub assembly 10 and, for example, the wheel remounted. Variations on this procedure while not deviating from the desired results may be apparent to those of skill in the art.

In another aspect of the invention, apparatus 20 may be used to adjust the endplay of a bearing. For example, in some bearing installations it is desirable to create an endplay for a bearing assembly, for example, an endplay of between about 0.001 inches and about 0.003 inches. For instance, see undated instructions entitled "ProTorq® Advanced Axle Spindle Nuts" flyer by Stemco, of Longview, Tex. Although procedures such as these which apply specified torques to the nut are intended to provide the specified endplay in the bearing, the inventor has found that the actual endplay provided by such procedures may vary dramatically. For example, the actual axial deflection of the bearings that results from the applied torque may vary due to, among other things, differences in torque resistance (or friction) between mating surface, for example, between nut 11 and the axle threads 15 and between the face of nut 11 and the surface of bearing 16, among others. Further errors may be introduced by such torque-based procedures by misalignment of the bearing rollers that may occur in between steps in the specified procedures. Therefore, there is a need in the art to provide an accurate and repeatable means of providing bearing endplay. One aspect of the invention addresses this need.

Aspects of the present invention eliminate the inaccuracies that are inherent in prior art endplay adjustment procedures and can be used to provide accurate end play settings of as fine as 0.001 inches and 0.002 inches. With reference to the cross section shown in FIG. 3, one method of providing accurate endplay adjustment includes the following steps. Starting with a greased and assembled wheel end assembly 10 (this procedure may be practiced with or without the wheels present), nut 11 is unloosened or installed and only fastened hand tight. The apparatus 20 shown in FIG. 1-4 is then mounted to the wheel hub assembly 10. Specifically, rod 40 having means 44, which comprises a fluid-containing housing 52, is attached to axle 14 by means of collar 46, and housing 42 is mounted to hub 12. In this aspect of the invention, the fluid in housing 52 is assumed to be hydraulic fluid. According to this procedure, nut 48 is rotated and advanced, for example, by means of arms 50 to produce a target hydraulic fluid pressure of, for example, 1000 psig, in cavity 56 as indicated by pressure indicator 60, for example, an analog pressure gage. The target pressure is typically predetermined by Equation 1 and the desired compressive deflection or endplay desired in bearing 18. The target pressure will vary depending upon the size and type of bearings used and the size of cavity 56, among other things.

The wheel hub assembly 10 is then rotated about spindle 14 at least one complete revolution, typically, at least three complete revolutions, to seat the rollers in inboard bearing 18. (See Timken Tech Tip Volume 1, Number 6 entitled "Why oscillate or rotate a bearing" http:://www.Timken.com/products/bearings/techtips/tip6.asp, the disclosure of which is incorporated by reference herein.) The pressure indicated by the pressure indicator 60 (that is, about 1000 psig) may vary as rollers 26 of inboard bearing 18 are seated by the rotation. If the pressure in cavity 56 deviates from the desired target pressure, the pressure in cavity 56 may be re-established by rotating nut 48, for example, by means of arms 50. The rotation of wheel assembly 10 about spindle 14 and the repressurization step may be repeated until rollers 26 of inboard bearing 18 are properly seated and the pressure indicted by pressure indicator 60 stabilizes to about the target pressure. It is understood that there may be slight variation in the pressure in cavity 56 due to slight misalignments (that is, the out of "squareness") of the installed bearing, among other things. The rollers 26 of inboard bearing 18 are then substantially seated in inner race 19.

Next, with the inboard bearing 18 properly seated by the above procedure, the endplay in outboard bearing 16 may be adjusted. While the target pressure (again, for example, about 1000 psig) is maintained in housing 52, nut 11 is rotated and tightened, for example, with a hand held wrench, on spindle 14, for example, slowly. During or after the tightening of nut 11, wheel assembly 10 is rotated about spindle 14 whereby rollers 22 of outboard bearing 16 are seated in inner race 15. The nut 11 is continued to be tightened until the pressure indicted by pressure indicator 60 just begins to drop. This drop in pressure indicates that the preload on inboard bearing 18 is being relieved by the compression of nut 11 against inner race 15 of outboard bearing 16. Nut 11 is then loosened slightly to so that the target pressure is regained, and thus the preload on inboard bearing 18 is reestablished, that is, typically, without retightening nut 48. This condition of adjustment, where the desired preload is established in the inboard bearing 18 and the compression of nut 11 on inner race 15 is such that any further tightening will unload the preload on inboard bearing 18, according to one aspect of the invention, is referred to as "the load reference point." Practicing aspects of the present invention, this load reference point can be fairly easily identified by feel by a mechanic. According to the invention, at this load reference point, the rollers in both outboard bearing 16 and inboard bearing 18 are properly seated and desired preload (that is, due to the 1000 psig pressure in housing 52) is applied to outer race 21 of inboard bearing 18.

According to aspects of the invention, a method and an apparatus are provided by which the mechanic can accurately determine the load reference point for a bearing assembly. Aspects of the present invention are not prone to the variability of the preload due to the unknown and unpredictable frictional forces between mating surfaces, regardless of what the desired bearing preload and/or endplay setting. According to aspects of the invention, after establishing the neutral point position, the mechanic may relatively easily provide the desired adjustment of nut 11 that accurately achieves the desired bearing preload and/or endplay setting.

As is known in the art, a known preload, for example, the 6000 pounds in the example above, results in a known value of axial compression of a bearing, for example, an axial compression of 0.004 inches. According to aspects of the invention, in the load reference point position, where both bearings are correctly aligned and at zero preload on nut 11, the preload on inboard bearing 18 will be captured by or transferred to nut 11 if nut 11 is loosened, for example, precisely 0.004" from the load reference point. Therefore, according to aspects of the invention, the preload may be varied or the endplay provided by precisely controlling the rotation of nut 11. One aspect of the present invention provides a method and apparatus for controlling the rotation of nut 11 to provide a desired preload or endplay.

According to one aspect of the invention, a method and a apparatus is provided of employing a calibrated wrench that can be used to accurately control the rotation of nut 11 to provide a desired preload or endplay. This method and apparatus are illustrated in FIGS. 6A, 6B, and 6C. FIGS. 6A, 6B, and 6C are partial axial elevation views of the apparatus 20 as viewed along the section lines 6-6 shown in FIG. 4 with the addition of a wrench 90. For ease of illustration, FIGS. 6A, 6B, and 6C only illustrate the portion of housing or frame 42, specifically ring 72 and posts 74. These figures also illustrate the end of shaft 14 and nut 11 mounted on shaft 14.

According to one aspect of invention, wrench 90 includes a handle 89 and two opposing tines 92 spaced to engage the opposite flats on nut 11. Wrench 90 also includes at least one recess 94 positioned between tines 92. Recess 94 includes two opposing end surfaces 91, 93 adapted to contact a post 74 and function as stops to the movement of wrench 90. In one aspect, stops 91, 93 may be provided by one or more projections or bosses between tines 92 instead of one or more recesses 94. In another aspect, the stopping surfaces may be provided by the closed ends of one or more slots 95 (shown in phantom) in ring 72 that are adapted to receive one or more pins 97 (also shown in phantom) projecting from beneath wrench 90. The one or more slots 95 may vary in length to correspond to one or more angular rotations. Other adaptations of wrench 90 and/or ring 72 and posts 74 may be provided to provide the desired limitations in the rotation of nut 11. Wrench 90 may have a thickness ranging from about 0.50 inches to about 1 inch or more.

As shown in FIG. 6A, recess 94 may have a common centerline with handle 89; however, recess 94 may be located anywhere between tines 92. In one aspect, a plurality of recesses 94, for example, 3 or more recesses 94, may be provided in wrench 90. According to one aspect of the invention, the arc length separating the opposing ends 91, 93 of recess 94 is provided to limit the rotation of wrench 90 when wrench 90 is used to rotate nut 11 to provide the desired preload or end play. This aspect of the invention is more clearly illustrated by describing one procedure that may be used as shown in the sequence of steps illustrated by FIGS. 6A, 6B, and, 6C.

In this example, the size of the recess 94 in handle 90, that is, the arc length between the ends 91, 93 of recess 94, is provided whereby the rotation of wrench 90 provides a predetermined angular displacement, $\alpha$. (As will be discussed below, this angular displacement, $\alpha$, may be determined from the desired preload or endplay and the pitch of the threads on spindle 14.) As shown in FIG. 6A, wrench 90 may be mounted to nut 11 whereby tines 92 engage opposing flats of nut 11 and recess 94 accepts one of the posts 74 of housing 42. As shown in FIG. 6B, the engaged wrench 90 and nut 11 are held fixed by holding handle 89 and hub 12 is carefully rotated in a clockwise direction as indicated by arrow 96 until one end 91 of recess 94 contacts a post 74. This contacting of end 91 of recess 94 upon post 74 establishes the base position for this angular adjustment of nut 11.

Now, as shown in FIG. 6C, hub 12 is fixed from further rotation, wrench 90 is rotated in a counter-clockwise direction—as indicated by arrow 98—whereby the opposite end 93 of recess 94 contacts post 74, and thus the rotation of nut 11 is limited to the arcuate spacing between the ends 91, 93 of recess 94. Since the wheel hub 12 is typically substantially more massive than wrench 90 and nut 11, hub 12 may simply be retained by hand, or other means, while rotating wrench 90 and nut 111. However, due to the relative inertia of hub 12, it may not be necessary for the mechanic to restrain hub 12 while rotating wrench 90 and nut 11, while ensuring that rotation of the wrench is stopped when end 93 contacts post 74.

It will be apparent to those of skill in the art that the desired angular rotation a of nut 11 is not the arcuate length between ends 91 and 93 of recess 94, but, due to the diameter of posts 74, the desired angular rotation a corresponds to the arcuate length between the center of posts 74 before and after rotation.

One example of the use of the method and apparatus described with respect to FIGS. 6A, 6B, and 6C, is illustrated by the following example. This example assumes that the wheel hub assembly 10 has been adjusted whereby a compression of bearing 18 has been established of, for example, 0.004 inches, and bearings 16 and 18 are in their "load reference point." It is also assumed that the desired endplay of bearing supports 16 and 18 is 0.001 inches and the threads on nut 11 and shaft 14 have a pitch of 12 threads per inch (that is, $1/12$ inches per revolution), which is a common pitch for truck axles. The total required displacement of nut 11 to overcome the preload compression and obtain the desired endplay is 0.004+0.001=0.005 inches. For a 12 pitch thread, the required rotation of nut 11 is (0.005 inches)/($1/12$ inches/revolution) =0.060 revolutions of nut 11 to provide the desired endplay, which corresponds to (0.060 revolutions)×(360 degrees/revolution)=21.6 degrees. For a typical spindle thread pitch of 12 threads per inch, an accuracy of 0.001 inches relates to more that four degrees of rotation of nut 11 or wrench 90, and that relates to an excursion of more than an eighth of an inch at the radial distance where post 74 is located. Therefore, by fabricating the recess 94 of handle 90 whereby angle $\alpha$ is, for example, 21.6 degrees, wrench 90 can be used in the procedure described above to provide the 0.001 inches of endplay desired in this example. Other examples of the use of wrench 90 will be apparent to those of skill in the art.

FIG. 7 illustrates a right elevation view, partially in cross section, of another arrangement 110 according to another aspect of the invention. In this aspect, fluid pressure in means 44 may provide the compressive load to bearing 18. In this aspect, of the invention, instead of the compressive force provided by the advancing of a nut, such as nut 48 in FIG. 3, the compressive force provided by nut 48 may be supplemented by or replaced by the fluid pressure force provided to means 44, for example, the fluid pressure provided to cavity 56 in housing 52 having piston 54. In this aspect, the fluid pressure may be provided by conduit or hose 200. Hose 200 may supply fluid, for example, hydraulic fluid, from a pressurized supply, for example, a pump. The fluid supplied to hose 200 may vary from 500 to 3000 psig. In one aspect, the fluid pressure provided through hose 200 may be the only supply of compressive force to bearing. In this aspect shown in FIG. 7, rod 40, shown in FIG. 3, is replaced by rod 140. Similar to rod 40, rod 140 engages spindle 14 as described in other aspects of the invention. However, contrary to rod 40, rod 140 includes a knob 145 that restrains means 44, for example, through an antifriction bearing. Knob 145 may be knurled or include a hand wheel or one or more arms 50 similar to nut 48.

The aspect of the invention shown in FIG. 7 may be used to automatically regulate the compressive load on bearing 18, for example, by regulating the pressure introduced to means 44 through hose 200. In one aspect, the invention may include an automatic controller, for example, a PID controller, personal computer, or PLC controller adapted to regulate the pressure in hose 200. For example, the predetermined preload or endplay and the parameters of the bearing being loaded may be entered into the controller and, after mounting rod 140, housing 42 and means 44 to hub 12, the controller may automatically ramp up the fluid pressure to provide the desired preload or to verify an existing preload. The aspect of the invention shown in FIG. 7 may be suitable for production line applications, among others.

In one aspect, the fluid provided by hose 200 may be provided by pressure increasing device, for example, a pressure intensifier, that is, a device that converts one pressure to a higher pressure. For example, the pressure-increasing device may be provided with a pressure supply of, for example, 100 psig (for instance, shop air) and increased to, for example, 2000 psig hydraulic fluid, which is then supplied to hose 200. Other sources of high-pressure fluid may be provided according to aspects of the invention.

It will also be understood that due to the variations in angle $\alpha$ that may be desired, for different bearings, different spindle pitches, and different endplays and preloads, among other things, many different wrenches 90 having recesses 94 of varying width may be provided. In one aspect of the invention, a plurality of recesses 94 of varying width or angle $\alpha$ may be provided in handle 90. In another aspect of the invention, recess 94 in handle 90 may be adjustable by the operator, for example, the position of at least one end of recess 94 may be variable to provide for varying angles $\alpha$. In another aspect, the width between tines 92 if wrench 90 may be variable to permit use of wrench 90 on nuts 11 of varying diameter. According to aspects of the invention, an adjustable wrench may be provided that can be calibrated for a desired preload and/or endplay values for a specific spindle and hub design.

Aspects of the invention may also be used to evaluate the preload or endplay on an existing bearing or bearing assembly. For example, an existing truck hub assembly may be evaluated for its existing preload and compared to the desired preload, and, if necessary, adjusted accordingly. First, the truck may be jacked up, if needed. (The hub may be allowed to cool, if necessary). Apparatus 20 may then be mounted to hub 12 and spindle 14 (with reference to FIG. 4) and the means 44 actuated to introduce tension to spindle 14 and compression to hub 12. (The wheel may be mounted to removed.) The means 44 may be regulated to, for example, vary the fluid pressure, to gradually increase the preload on bearing 18. While the load is increased, a mechanic can repeatedly check the load on or the "tightness" of nut 11. When nut 11 begins to loosen, the existing preload on bearing 18 has been met or exceeded. A comparison of the actual preload indicated by means 44, for example, the fluid pressure, with the desired preload can then be made. Any adjustments to the preload, either higher or lower, can be made according to the procedures described above.

While one aspect of the present invention, in which the inboard bearing 18 is loaded through hub 12, can provide a useful indication of the preload present in bearings 16 and 18, for example, by assuming a predetermined distribution of load between bearing 16 and 18 and distributing the preload measured on bearing 18 accordingly, other aspects of the invention can provide an more accurate indication of the preload on bearings 16 and 18. For example, the aspect of the invention illustrated and described with respect to FIG. 5 above and the aspect of the invention illustrated and described with respect to FIGS. 8 through 19 below, in which the loading of bearings 16 and 18 transmitted via bearing 16.

Figure 8:
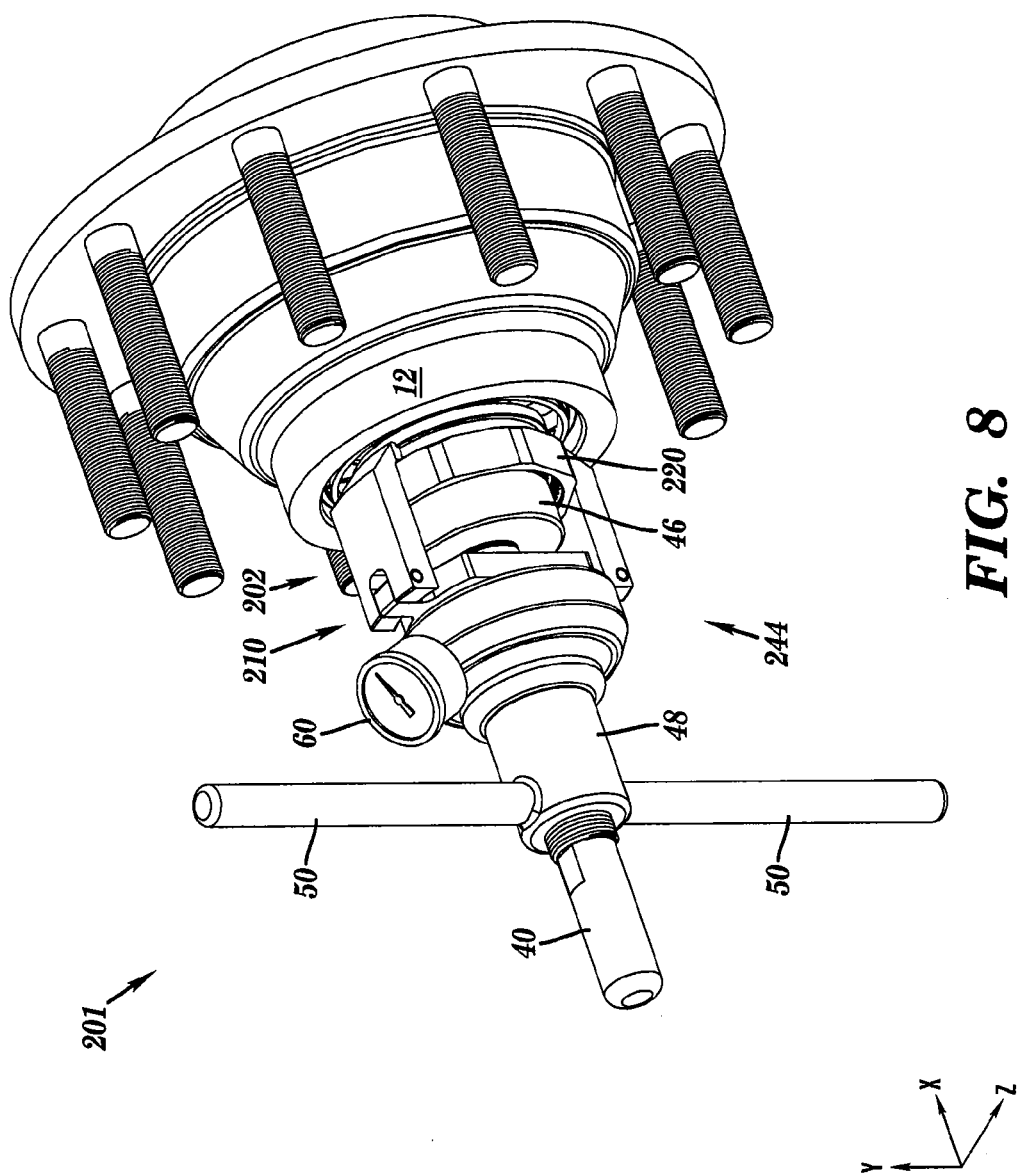
FIG. 8 is perspective view of a wheel hub assembly having a bearing preloading apparatus according to another aspect of the invention.

FIG. 8 is perspective view of a wheel hub assembly 201 having a bearing preloading assembly 202 according to another aspect of the invention. As will be discussed more fully below, in contrast to the apparatus discussed above with respect to FIGS. 1-5, preloading assembly 202 introduces a load to the outboard bearing 16, instead of to hub 12. According to this aspect of the invention, contact with the inner race of the outboard bearing is accomplished by means of specially designed axle nut or an axle nut arrangement. Unlike prior art methods and devices, aspects of the invention permit mechanics to apply or confirm a preload to outboard bearing 16.

Figure 9:
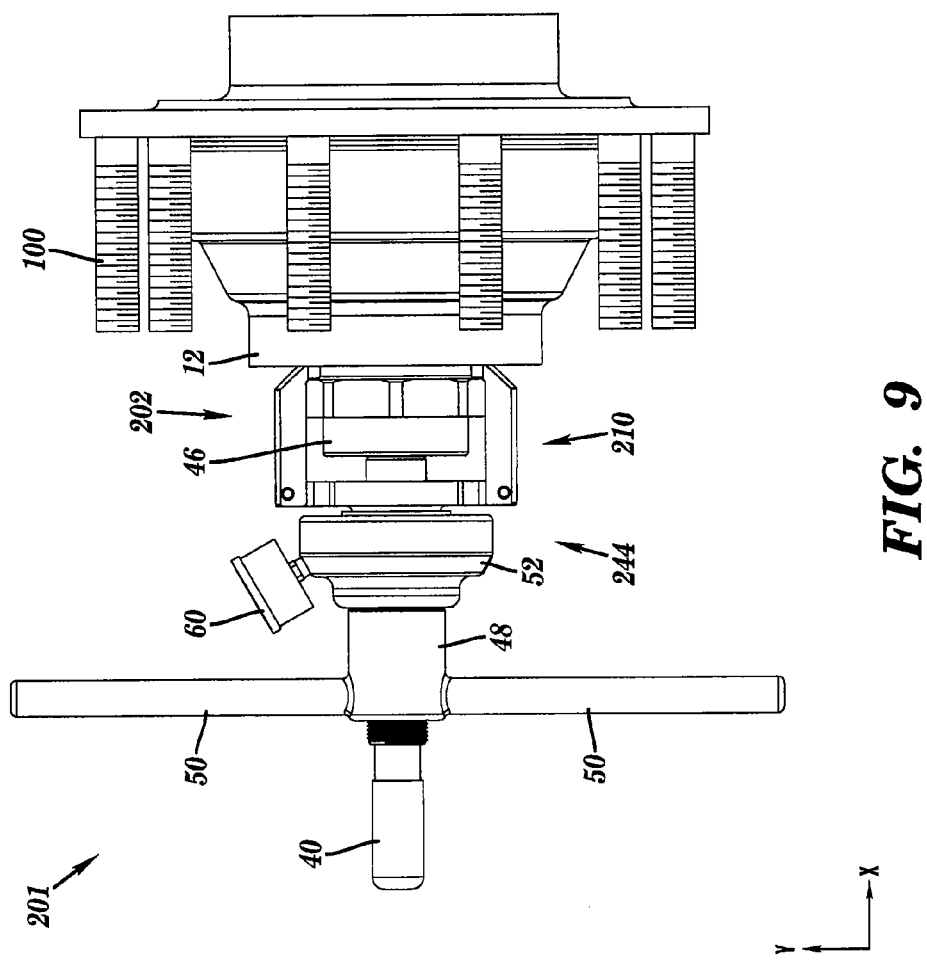
FIG. 9 is a right side elevation view of the hub assembly shown in FIG. 8.
Figure 10:
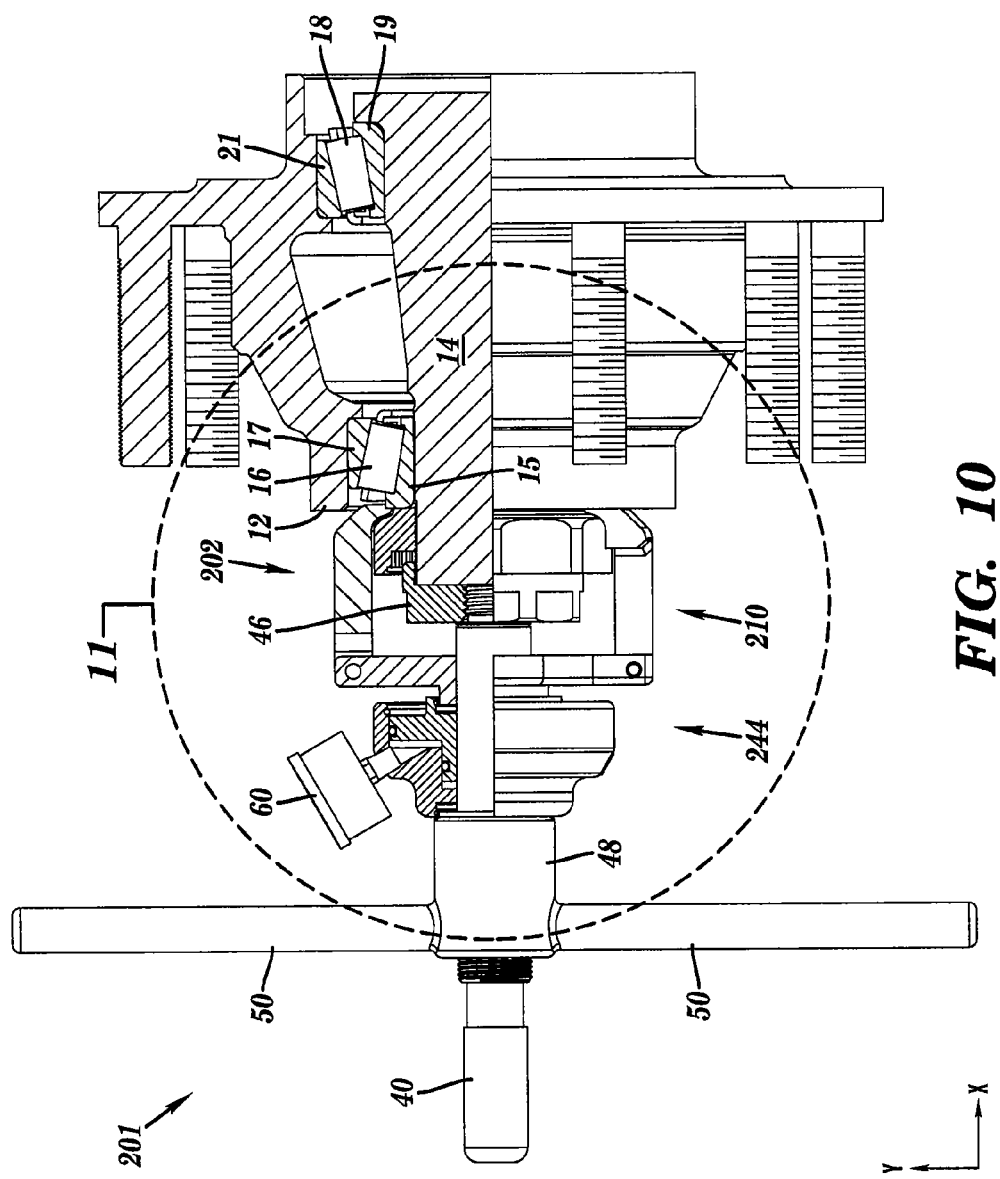
FIG. 10 is a right side elevation view, partially in cross section, of the assembly shown in FIG. 8

FIG. 9 is a right side elevation view of the hub assembly 201 shown in FIG. 8 and FIG. 10 is a right side elevation view, partially in cross section, of the assembly shown in FIG. 8.

Figure 11:
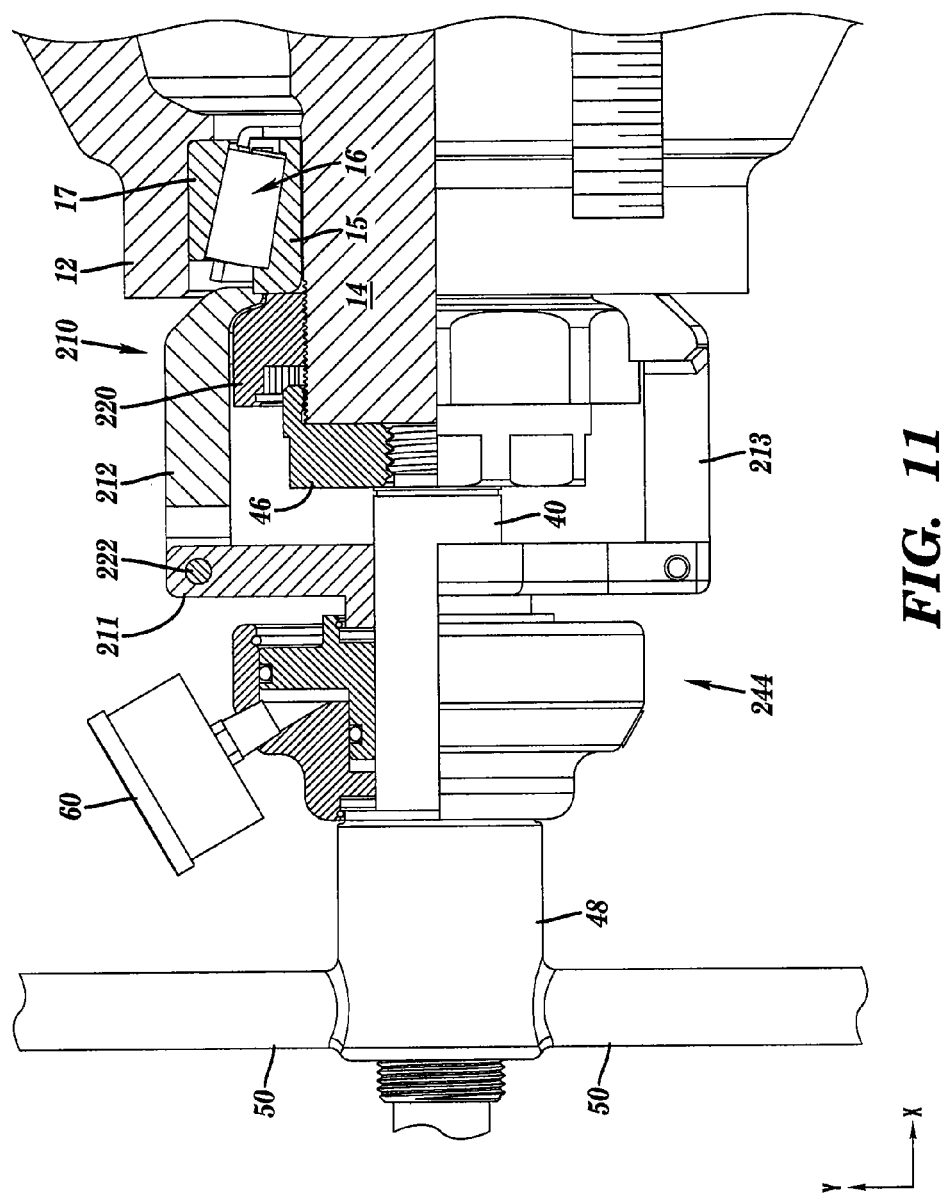
FIG. 11 is a detailed view of the means for providing a preload shown in FIG. 10 and identified by detail 11.

FIG. 11 is a detailed view of the means for providing a preload shown in FIG. 10 and identified by detail 11. FIGS. 8-11 are views similar to those shown in FIGS. 1-3 and include many of the structures shown in FIGS. 1-3, which are identified with the same reference numbers that appear in FIGS. 1-3. These structures may typically comprise the same structures having the same properties as those discussed above with respect to FIGS. 1-5. For example, hub assembly 201 in FIGS. 8-11 includes a hub 12, a threaded shaft, axle, or "spindle" 14, an outboard antifriction bearing 16, an inboard antifriction bearing 18. As shown in FIG. 10, outboard bearing 16 includes an inner race (or cone) 15 and an outer race (or cup) 17, and inboard bearing 18 includes an inner race (or cone) 19 and an outer race (or cup) 21.

As also shown in FIGS. 8-11, wheel hub assembly 201 includes preload assembly 202 that, similar to preload assembly 20 shown in FIGS. 1-5, includes a rod or shaft 40 mounted to spindle 14 by means of collar 46, and a means 244 for providing a compressive load to bearing 16. Again similar to the aspects shown in FIGS. 1-5, means 244 of preload assembly 202 shown in FIGS. 8-11 includes a nut 48 threaded to shaft 40. Nut 48 may include arms 50 or a hand wheel to assist the operator in rotating nut 48. Means 244 of preload assembly 202, similar to means 44 discussed above with respect to FIGS. 1-5, may provide a compressive load to bearing 16 or means 44 may be any means that is adapted to transfer the compressive load provided by nut 248 to the inner race 15 of bearing 16. In one aspect, means 244 provides a means for monitoring the compressive load transferred, for example, some form of direct or indirect indication of the load transferred to inner race 15, as described above with respect to means 44, for example, by means of compression springs, electronically, or by means of a fluid pressure sensor, such as pressure gage 60.

According the aspect of the invention shown in FIGS. 8-11, the compressive load of nut 48 and/or means 244 is transmitted to bearing 16, and to bearing 18, by means of loading adapter 210. In one aspect, loading adapter 210 works in conjunction with modified axle nut 220 to provide a load to inner race 15 of outboard bearing 16. As described above, for example, with respect to FIGS. 4 and 5, conventional axle nuts, for example, axle nut 11 in FIG. 5, are typically larger in diameter than inner race 15 of bearing 16 whereby no direct physical contact can be made with race 15 to, for example, apply a load. Under some conditions, for example, as shown in FIG. 5, axle nut 11 may be smaller in diameter than inner race 15 where inner race 15 may be directly contacted, for example, by housing 142, to provide a load. In the aspect of the invention shown in FIGS. 8-11, a specially designed axle nut 220 having a recess that exposes the surface of inner race 15 and permits contact by for example, loading adapter 210. According to aspects of the invention, loading adapter 210 transmits the compressive load from nut 48 and/or means 244 to inner race 15 of bearing 16, and thus to bearing 18. In one aspect, where race 15 is exposed, load adapter 210 may be used with a conventional axle nut, for example, axle nut 11 in FIG. 3. However, when inner race 15 would be concealed by a conventional axle nut, modified axle nut 220 may be used according to aspects of the invention.

In contrast to other aspects of the invention, for example, those illustrated in FIGS. 4 and 5, the aspect of the invention shown in FIGS. 8-11 may provide a more accurate and reproducible indication of an existing or desired preload on bearings 16 and 18. For example, since the load applied, for example, via means 244, is directed to bearing 16 and from bearing 16 to bearing 18, the load monitored and indicated by means 244 is thus a more accurate indicator of the combined preload on bearings 16 and 18, for instance, no load bearing relationship need be assumed regarding the relative preloads on bearing 16 and 18.

Figure 12:
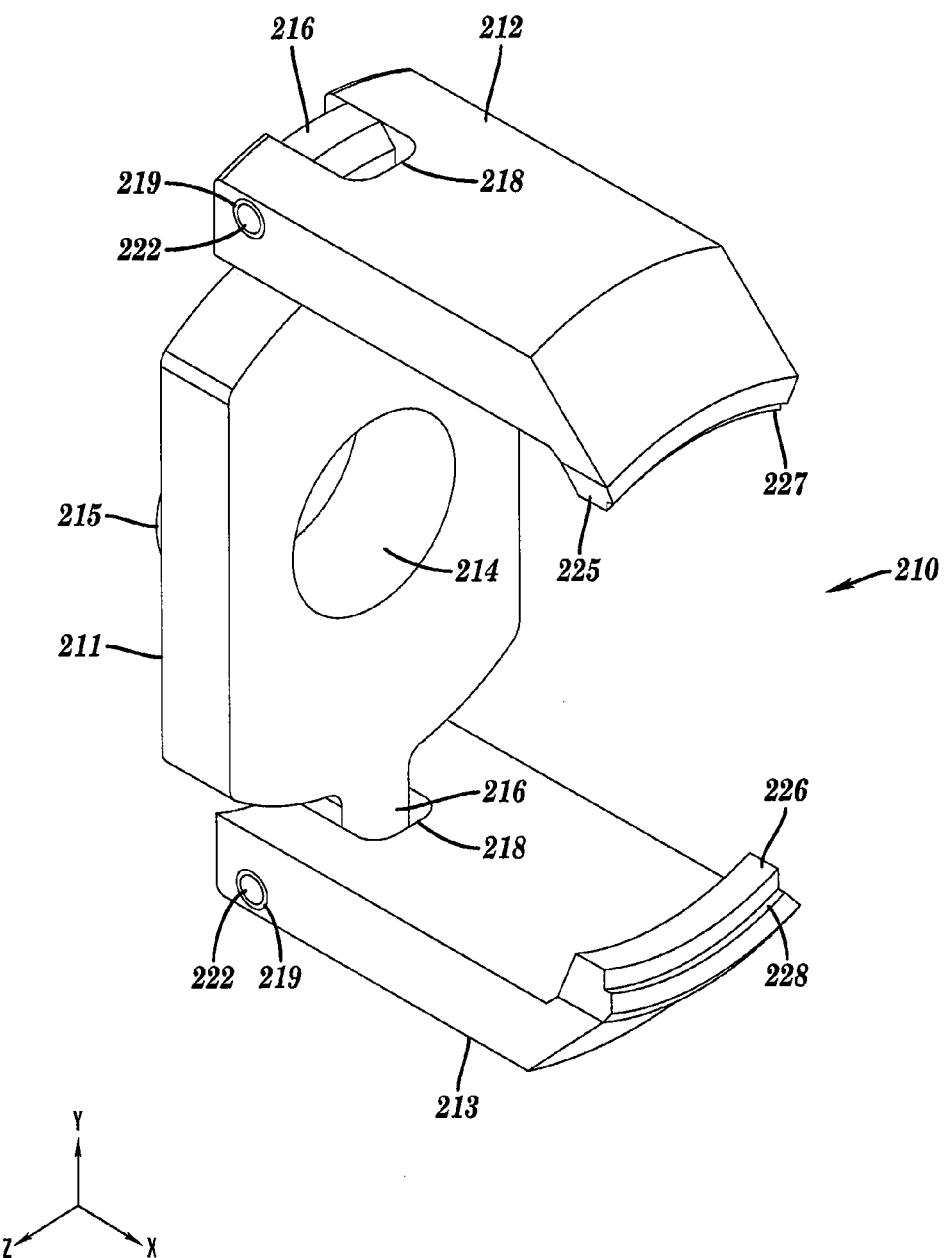
FIG. 12 is perspective view of the bearing loading adapter shown in FIG. 11.
Figure 13:
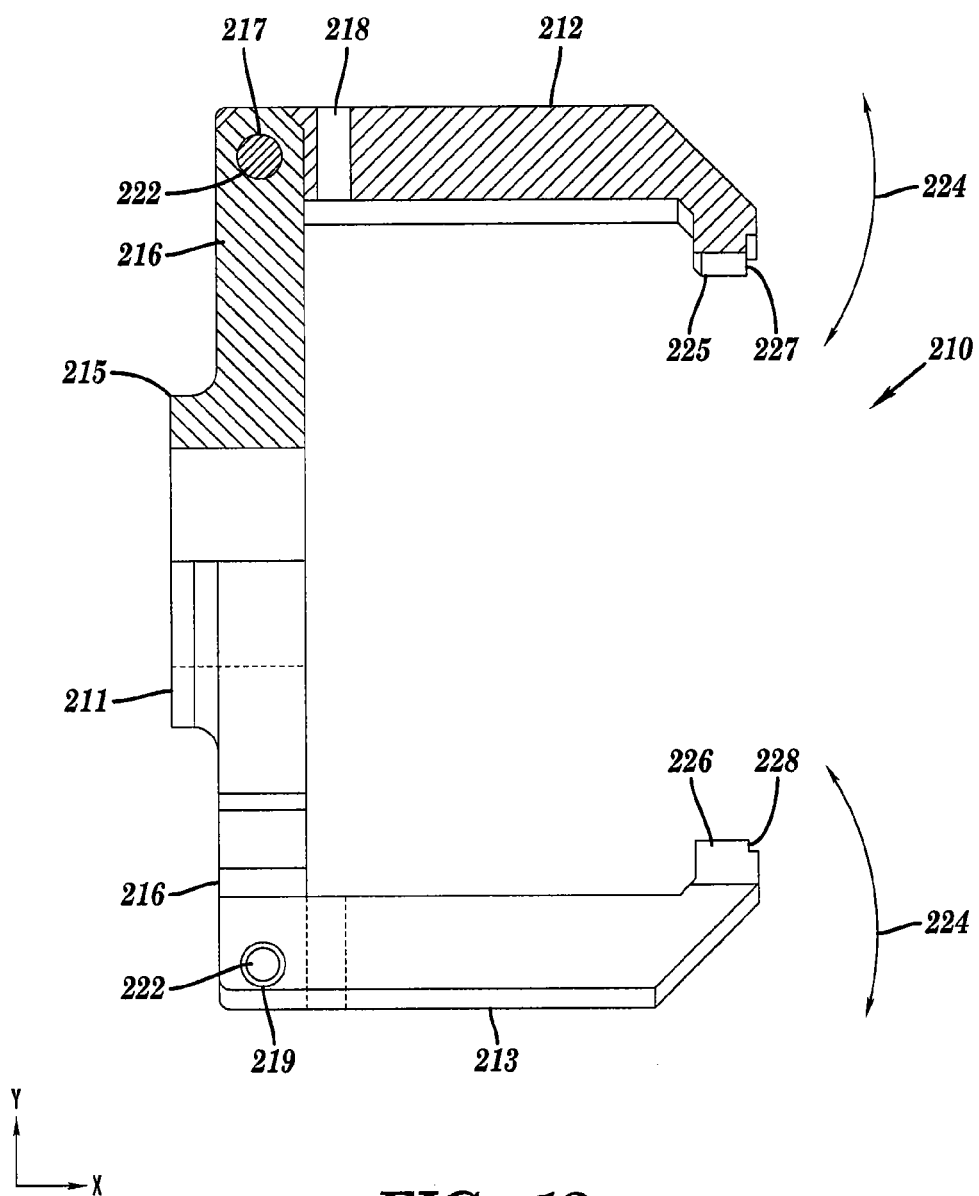
FIG. 13 is a side elevation view, partially in cross section, of the bearing loading adapted shown in FIG. 12.
Figure 14:
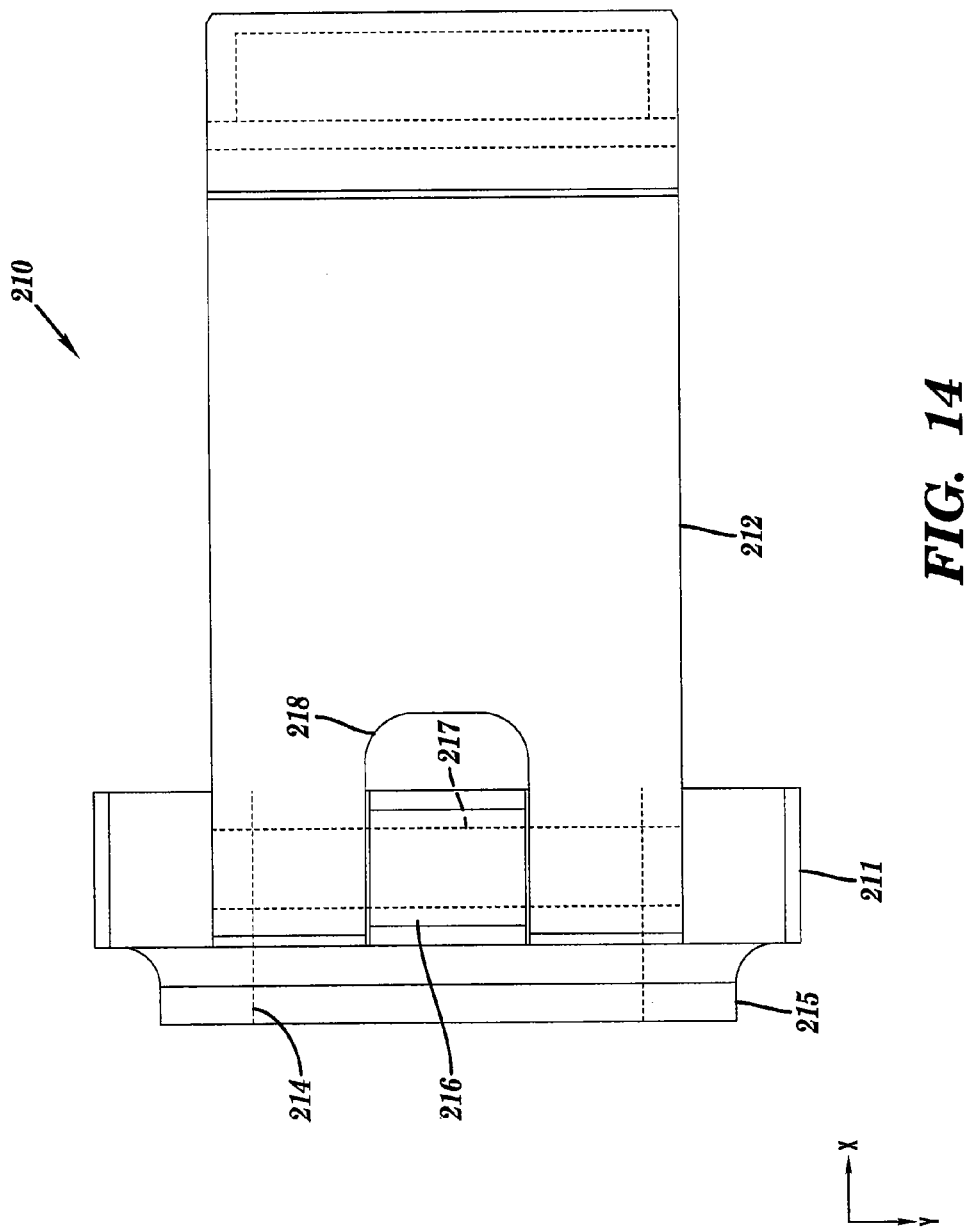
FIG. 14 is top plan view of the bearing loading adapter shown in FIG. 12.

FIG. 12 is perspective view of the bearing loading adapter 210 shown in FIG. 11. FIG. 13 is a side elevation view of the bearing loading adapter 210 shown in FIG. 12 and FIG. 14 is top plan view of bearing loading adapter 210 shown in FIG. 12. As shown, adapter 210 includes a plate 211 and at least two extensions, fingers, or arms 212, 213 from plate 211. In this aspect of the invention, extensions 212 and 213 are adapted to transmit the load applied to plate 211, for example, by the compression of nut 48, to the bearing 16. As shown in FIGS. 12-13, plate 211 typically includes a through hole or bore 214 that is adapted to receive rod 40, as shown in FIG. 11. Plate 211 may also include a raised boss 215 adapted to contact means 244 for example, adapted to contact piston 54 or bearing 64 (see FIG. 4). In one aspect, extensions 212 and 213 may be moveable or deflectable to facilitate assembly of adapter 210 into engagement with bearing 16. For example, extensions 212 and 213 may include any interface with plate 211 or modification to extensions 212 and 213 that permits extensions 212 and 213 to deflect to avoid interference with nut 11 or nut 220. As shown in FIGS. 12-14, in one aspect, extensions 212 and 213 may be pivotally mounted to plate 211. Plate 211 may include a pair of lugs or projections 216 having through holes 217 and extensions 212, 213 may include recesses 218 adapted to receive projections 216 and extensions 212, 213 may include through holes 219. Pins 222 may be provided in holes 219 in extensions 212, 213 that engage holes 217 in projections 216 whereby extensions 212, 213 may rotate about pins 222 as indicated by double arrows 224 in FIG. 13.

Arms or extensions 212, 213 may include projections 225, 226, respectively, for example, arcuate projections adapted to engage the arcuate shape of inner race 15 of bearing 16. Arcuate projections 225, 226 may be radiused to provide the same curvature of inner race 15, for example, a radius of between about 1¼ inches and about 3 inches. Projections 225, 226 may include shoulders 227, 228, respectively, to assist in engaging race 15. In one aspect, since pins 222 (which transmit the load from plate 211 to extensions 212, 213) may be located at a greater radial distance from the center of shaft 14 than the radial distance to the point of contact on inner race 15 (see FIG. 11), shoulders 227, 228 may be provided to minimize or prevent contact of projections 225, 226 with nut 220. This aspect of the invention may ensure that the compressive load applied by means 244 is transmitted to race 15 and not borne by nut 220. Minimizing or preventing contact between extensions 212, 213 and nut 220 also permits nut 220 to be freely rotated without contact with extensions 212, 213.

Although only two extensions 212, 213 are illustrated in FIGS. 12-14, according to one aspect of the invention, two or more extensions 212, 213 may be mounted to plate 211. For example, three or more extension 212, 213 may be provided, for example, uniformly spaced about plate 211. In one aspect, plate 211 may be a circular plate having two or more extensions 212, 213. In one aspect of the invention, extensions 212, 213 may include spring-loaded mountings to plate 211 whereby extensions 212, 213 are biased into a position of engagement with race 215. Adapter 210 and its components may be fabricated from any conventional structural metal, for example, iron, steel, stainless steel, aluminum, titanium, nickel, magnesium, brass, or bronze, among others.

Figure 16:
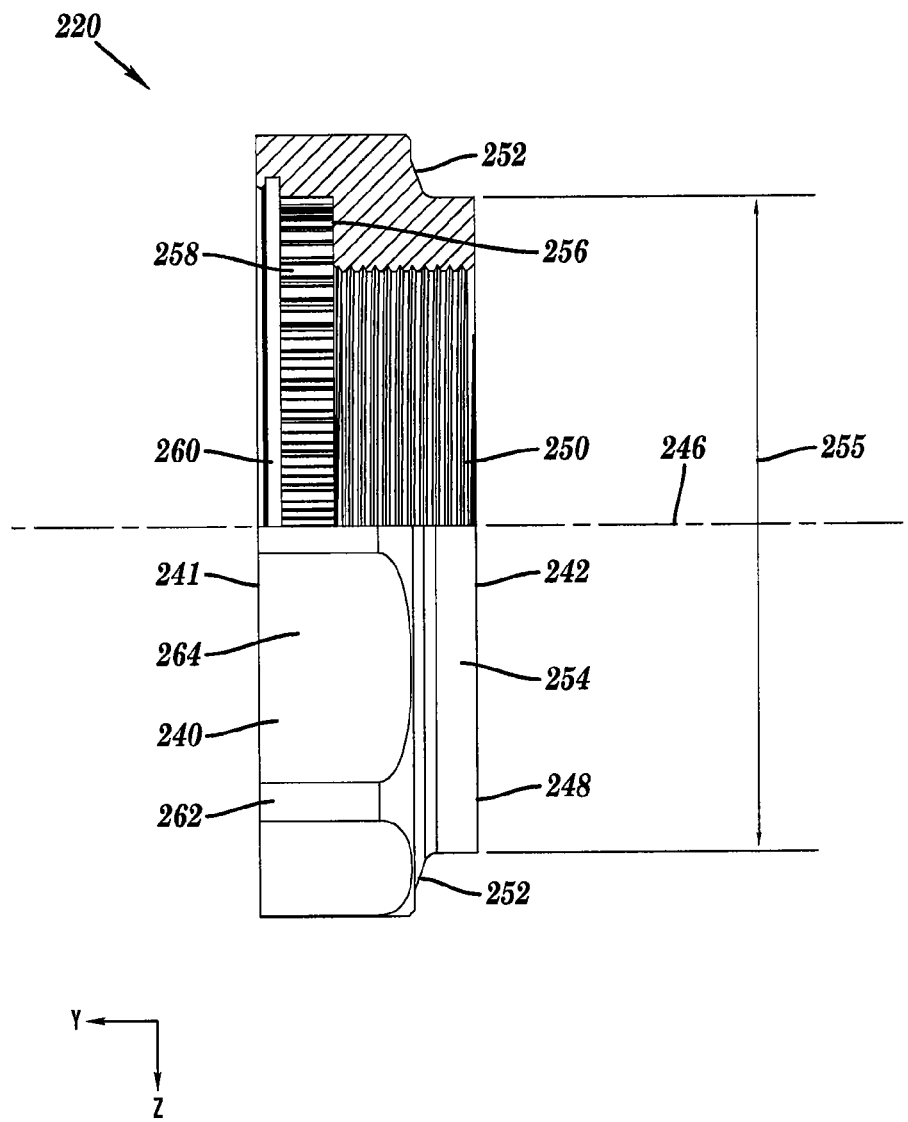
FIG. 16 is a side elevation view, partially in cross section, of the axle nut shown in FIG. 15.

FIG. 15 is a perspective view of an axle nut 220 according to another aspect of the invention. FIG. 16 is a side elevation view, partially in cross section, of axle nut 220 shown in FIG.

15. As shown in FIGS. 15 and 16, nut 220 includes a cylindrical body 240 having a first end 241 and a second end 242 and a longitudinal axis 246. Cylindrical body 240 may be a circular cylindrical body or a non-circular cylindrical body, for example, a polygonal cylindrical body, such as body having a triangular, square, pentagonal, hexagonal, or octagonal cross section, among others, having a plurality of flat sections, that is, "flats."

Second end 242 includes a face 248 adapted to contact the face of inner race 15 (see FIG. 11). Body 240 includes a threaded through hole or bore 250 directed substantially along the longitudinal axis 246 of body 240. The threads of through hole 250 may comprise any conventional UN, UNC, UNF, UNJ, Acme, or other conventional thread. In one aspect, of the invention where nut 220 is used for a conventional truck axle, threaded through hole 250 may have 12 to 18 threads per inch UN threads.

According to aspects of the present invention, second end 242 of body 240 may include at least one recess 252 in face 248. As described above, recess 252 in the face 248 exposes at least a portion of the mating surface against which nut 220 bears whereby a compressive load may be applied, for example, to apply a compressive load to the face of inner race 15 of bearing 16 (see FIG. 11). As described above, this exposure of the face of race 15 permits a mechanic to apply and/or verify a preload on bearing 16, for example, to verify a preferred "3 thousandths" preload discussed previously.

Figure 20:
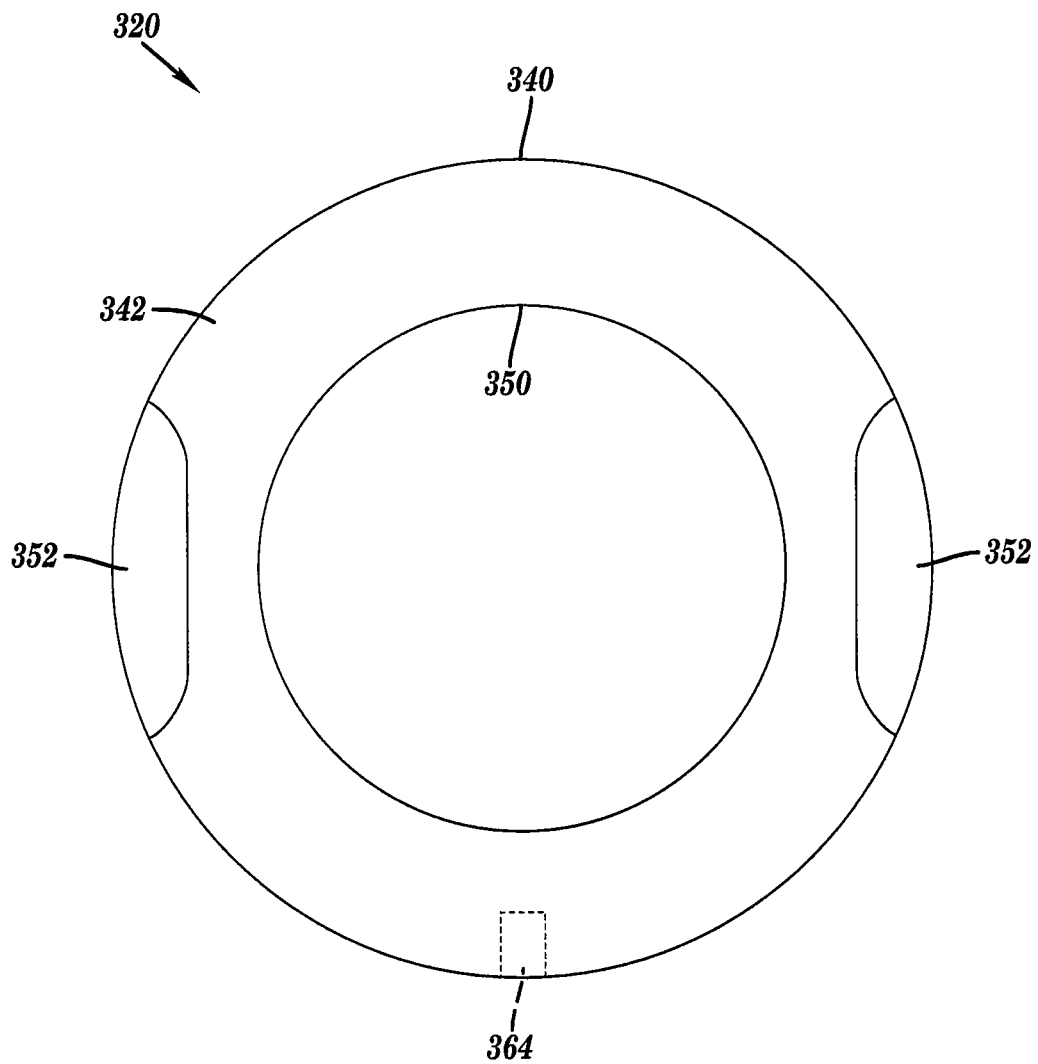
FIG. 20 is a plan view of an axle nut according to another aspect of the invention.
Figure 21:
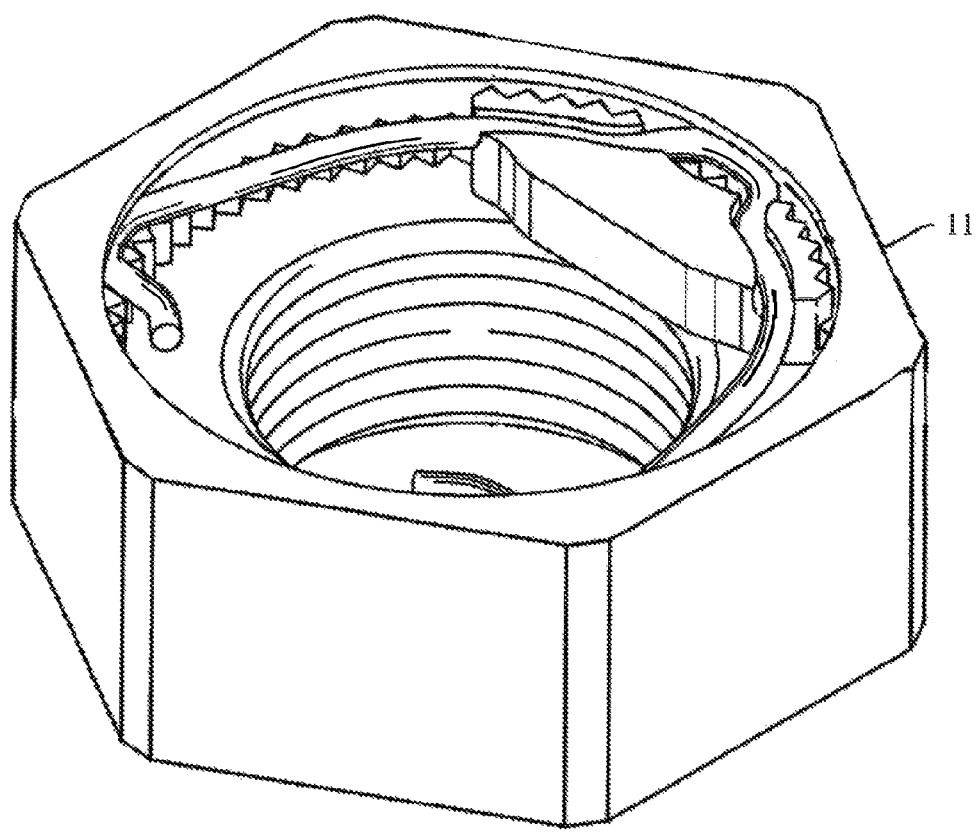
FIG. 21 is a perspective view of a lock nut system which includes a lock nut having a keeper and a keeper retaining member engaged with the nut.

In the aspect of the invention shown in FIGS. 15 and 16, recess 252 is shown as a single annular or arcuate recess whereby a raised boss 254 is provided on second end 242. FIG. 20 is a plan view of an axle nut 320 having a body 340 and a threaded through hole or bore 350 according to another aspect of the invention. However, according to one aspect of the invention, the at least one recess 252 may comprises one or more cavities in surface 248, for example, one or more cavities evenly distributed about the perimeter of the second end 242. For instance, in one aspect of the invention, as shown in FIG. 20, recess 252 may comprise a plurality of arcuate cavities or recesses 352 evenly distributed about the perimeter of second end 342 and adapted to expose the surface of the mating surface, for example, whereby two or more extensions on adapter 210, for example, extensions 212, 213 in FIG. 12, may contact the mating surface, for example, the mating surface of bearing 16. As shown in FIG. 16, the diameter of boss 254, or the inside diameter of the plurality of recesses in second end 242 may have a diameter 255. According to one aspect of the invention, diameter 255 is sized to provide sufficient support for inner race 15 while providing at least some exposure to the surface of race 15 whereby a loading device, for example, adapter 210, may contact inner race 15. For example, diameter 255 may be at least as large as the minimum "backing diameter" recommended by the manufacturer of bearing 16.

As shown in FIGS. 15 and 16, first end 241 of body 240 may be adapted to accommodate a nut locking mechanism, for example, the nut locking mechanism disclosed in copending and commonly-assigned application Ser. No. 11/029,531 entitled "Lock Nut System" filed on Jan. 5, 2005, the disclosure of which is included by reference herein. For example, first end 241 of body 240 may include a counter bore 256 having a plurality of internal projections 258 and an annular groove 260. Internal projections 258 may be gear teeth or spline teeth adapted to engage a locking device (not shown) and annular groove 260 may be adapted to retain a locking device retainer (not shown), such as described in co-pending application Ser. No. 11/029,531. In one aspect of the invention, no counter bore 256 or annular groove 260 may be provided in first end 241 whereby first end 241 may only comprise a flat surface interrupted by threaded through hole 250.

Body 240 may also be adapted to be engagable by a tool, for example, a crescent wrench, spanner wrench, or socket, among other tools, whereby body 240 may be rotated as desired. In one aspect, as shown in FIGS. 15 and 16 body 240 may comprise an outside surface 262 having at least one flat 264, but typically a plurality of flats 264 adapted to engage a tool, such as a wrench or socket. In another aspect body 240 may include at least one recess, hole, or slot adapted to engage a spanner-type tool. For example, in one aspect, as shown in FIG. 20, outside surface 362 of body 340 may include holes or slots 364 (shown in phantom) adapted to engage a spanner wrench. In another aspect of the invention, any other surface of body 240, 340 may include recesses, holes, or slots adapted to engage a spanner-type wrench, for example, the surface of end 241 may include a plurality of equally spaced holes or the surface of counter bore 256 may include a plurality of equally spaced holes. Other adaptations of body 240, 340 to facilitate engagement by a tool for rotating nut 220, 320 will be apparent to those of skill in the art.

Nut or fastener 220 may be fabricated from any one or more the structural metals mentioned above, for example, carbon steel or stainless steel. Nut 220 may be fabricated by machining from a billet or plate, by forging or casting and then finished machining, or fabricated by conventional powder metallurgy techniques. In one aspect, when formed by powder metallurgy, the material may be FC 0208, or its equivalent. Nut 220 may also be surface hardened for example, induction hardened, carburized, or nitrided, among other surface hardening methods; in one aspect, the exposed surfaces on end 241 of nut 220 may be hardened, for example, induction hardened.

One method of providing a preload to an axle bearing and minimizing the likelihood of losing the preload is to provide a nut arrangement including a first load adjusting nut, a lock washer that prevents the load adjusting nut from loosening, and a second jam nut that bears against the lock washer to secure the lock washer in place. Such a hardware arrangement can be found in most conventional original equipment truck and trailer axles. However, in this prior art arrangement, the first load adjusting nut is typically at least as large in diameter as the inner race of the bearing to which it applied. Therefore, when employing such prior art nut arrangements, the inner race is typically not accessible by a bearing loading or verification device, such as aspects of the invention. However, the aspect of the invention shown in FIGS. 17-19 addresses the limitations of the prior art bearing loading devices by, among other things, allowing access to the inner bearing race for loading and/or preload verification when a nut-lock washer-jam nut arrangement is provided.

Figure 17:
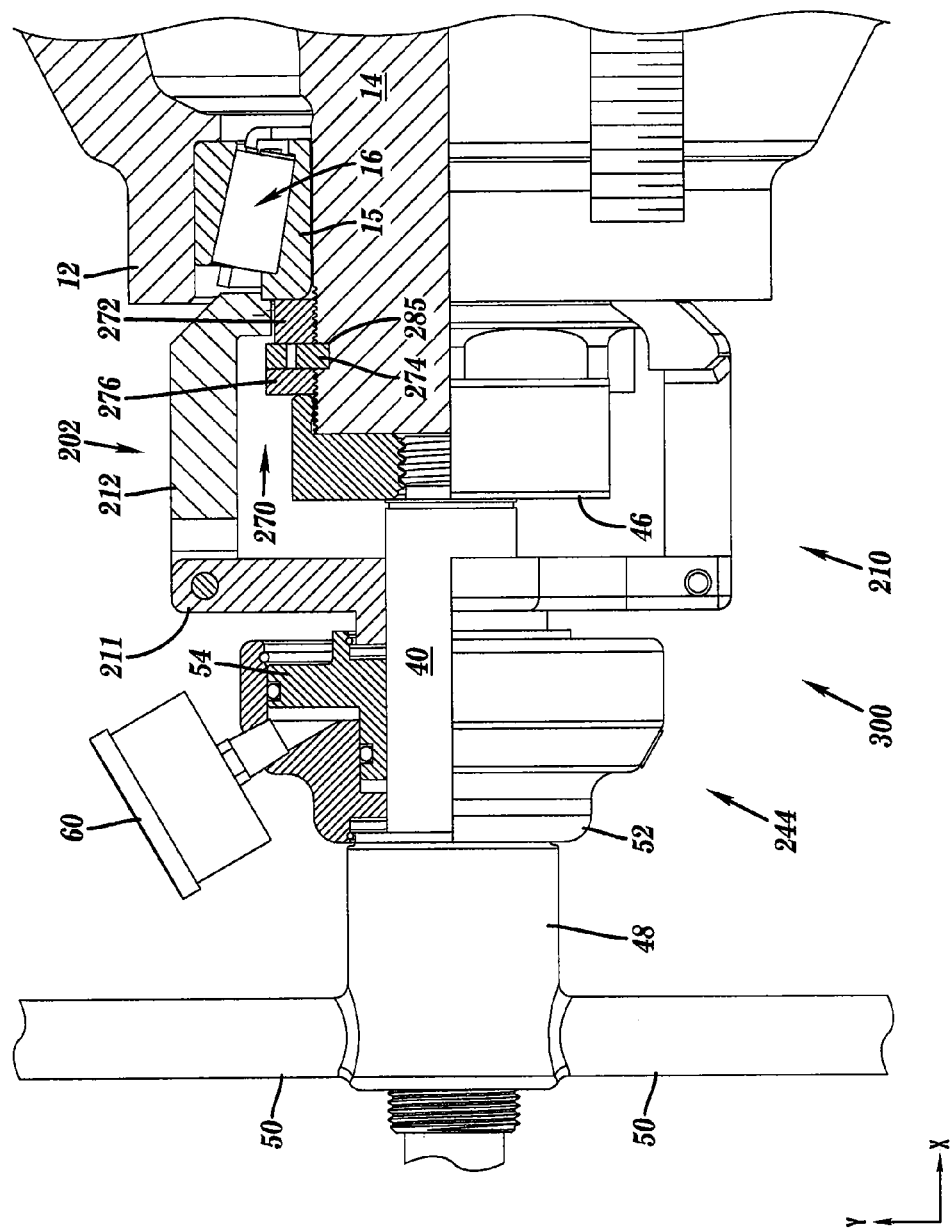
FIG. 17 is a side elevational view, partially in cross section and similar to FIG. 11, of an apparatus for applying or verifying a preload on a bearing according to another aspect of the invention.

FIG. 17 illustrates still another aspect of the invention for applying or verifying a load or preload to a bearing. FIG. 17 is a side elevational view, partially in cross section, of an apparatus 300 for applying or verifying a load or preload on a bearing according to another aspect of the invention. FIG. 17 is a view similar to FIG. 11 and includes many of the structures that may have similar if not identical functions to those structures that appear in FIG. 11. These similar structures are identified in FIG. 17 by the same reference numbers shown in FIG. 11. Some of these common structures shown in FIG. 17 include wheel hub 12, shaft 14 (shown in cross section in FIG. 17), inner bearing 16 having inner race 15, and means 244 having shaft 40, coupling 46, nut 48, gage 60, and adapter 210. According to this aspect of the invention, apparatus 300 also includes a nut or fastener arrangement 270 that is an alternative to nut 220 shown in FIG. 11. Nut arrangement 270 includes a first internally threaded ring 272, a second ring 274, and a third threaded ring 276. According to this aspect of the invention, nut arrangement 270 provides a means for ensuring a preload is maintained in bearing 16 while minimizing or preventing the removal of this preload, for example, during normal operation of the vehicle. In addition, arrangement 270 also provides access to inner race 15 whereby a bearing loading device, such as adapter 210, may access the surface of inner race 15 to provide a desired load or preload to the inner race 15. For example, close examination of FIG. 17 with nut arrangement 270 installed, illustrates how a surface of inner race 15 can be contacted by extensions 212 of adapter 210.

Figure 18:
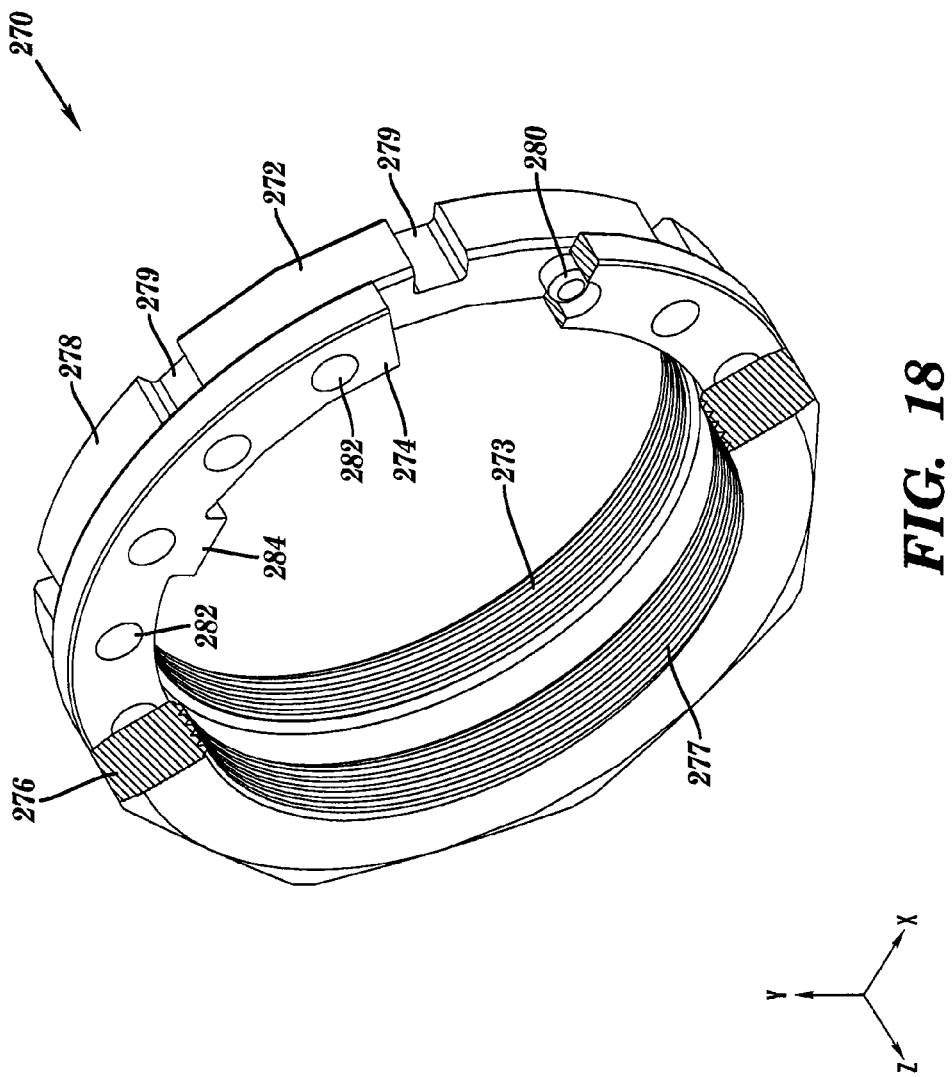
FIG. 18 is a perspective view, partially in cross section, of a nut arrangement shown in FIG. 17 according to another aspect of the invention.
Figure 19:
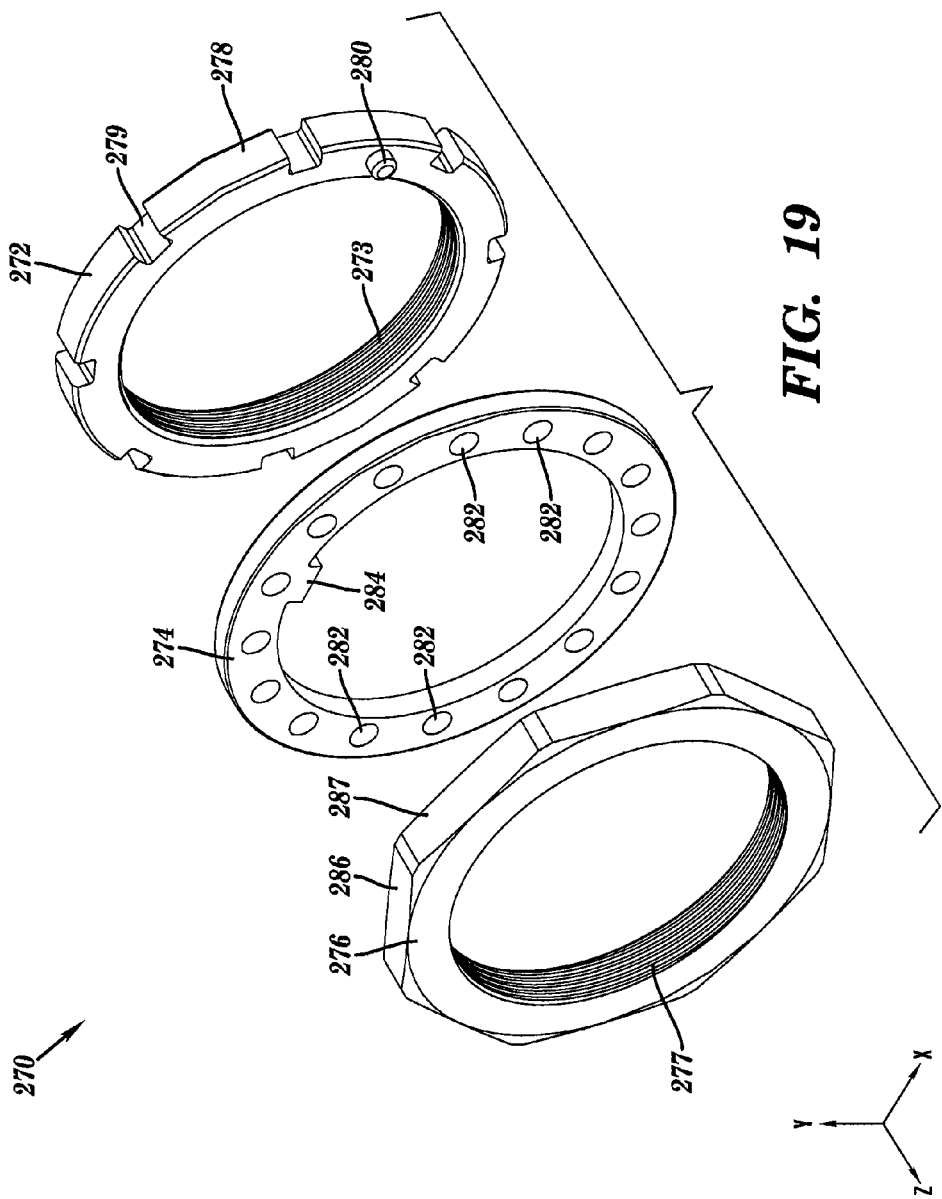
FIG. 19 is an exploded perspective view the nut arrangement shown in FIGS. 17 and 18.

FIG. 18 is a perspective view, partially in cross section, of nut arrangement 270 shown in FIG. 17. FIG. 19 is an exploded perspective view of the elements of nut arrangement 270 shown in FIGS. 17 and 18. As shown in FIGS. 18 and 19, nut arrangement 270 includes a first threaded ring or nut 272, a second ring 274, and a third threaded ring or nut 276. As noted with respect to diameter 255 of nut 220 in FIG. 16, the outer diameter of ring or nut 272 may have a diameter sized to provide sufficient support for inner race 15 while providing at least some exposure to the surface of race 15 whereby a loading device, for example, adapter 210, may contact inner race 15. For example, the outer diameter of ring or nut 272 may be at least as large as the minimum "backing diameter" recommended by the manufacturer of bearing 16.

Ring or nut 272 includes internal threads 273 adapted to threadably mount to shaft 14 and engage the inner bearing race 15 (see FIG. 17). Ring or nut 272 includes an outer surface 278 that may be engagable by a tool, for example, a crescent wrench, spanner wrench, or similar tool. For example, as shown in FIGS. 18 and 19, the outer surface 278 of ring or nut 272 may include one or more grooves 279 engagable by a spanner-type wrench. Grooves 279 may also be slots, notches, holes, or other indentations in surface 278. In lieu of or in addition to grooves 279, the outer surface 278 of ring 272 may include projections, for example, one or more spokes, engagable by a tool or a mechanic. Also, according to an aspect of the invention, ring or nut 272 may have an outer diameter that is less than the outer diameter of inner race 15, that is, whereby at least a portion of the longitudinal surface of race 15 is accessible for contact by, for example, adapter 210 (again, see FIG. 17). Ring or nut 272 may also include means for engaging ring 274 to prohibit relative movement, specifically relative rotational movement, between ring 272 and ring 274. For example, as shown in FIGS. 18 and 19, ring 272 may include one or more projections or pins 280 adapted to engage a hole or a recess in ring 274. Pin 280 may be press or shrink fit into ring 272 or pin 280 may simply be punched into ring 272. In one aspect of the invention, ring 272 may include a hole or a recess that accepts a projection or pin in ring 274. Threads 273 may be any one of the threads mentioned above, but are typically 12 to 18 threads per inch UN threads.

Second ring 274 is also adapted to mount to shaft 14 (see FIG. 17) and includes means for engaging ring 272 to prohibit relative movement between second ring 274 and first ring 272 and second ring 274 includes means for engaging shaft 14 to prohibit relative movement between second ring 274 and shaft 14, specifically prohibit rotational movement. For example, as shown in FIGS. 18 and 19, ring 274 may include one or more holes or recesses, for example, through holes 282. Through holes 282 are adapted to engage one or more pins or protections 280 in ring 272 to prohibit relative rotational movement between ring 274 and ring 272. Again, in one aspect, ring 274 may include one or more pins or projections, similar to pin 280, that are adapted to engage one or more holes or recesses in ring 272. The means for engaging shaft 14 in ring 274 may comprise any recess or projection adapted to engage shaft 14. For example, as shown in FIGS. 18 and 19, ring 274 may include one or more projections or key-type structures adapted to engage a recess in shaft 14. For example, ring 274 may include one or more key-type projections 284 that are adapted to engage a slot or keyway 285 in shaft 14 (see FIG. 17). In one aspect, arrangement 270 may include one or more separate individual keys that are adapted to engage one or more keyways in ring 274 and one or more keyways 285 in shaft 14.

Third threaded ring or nut 276 includes internal threads 277 adapted to threadably mount to shaft 14 and engage second ring 274 (see FIG. 17). Ring or nut 276 includes an outer surface 286 that may, similar to ring 272, be engagable by a tool, for example, a crescent wrench, spanner wrench, or similar tool. For example, as shown in FIGS. 18 and 19, the outer surface 286 of ring or nut 276 may include one or more flats 287 engagable by a crescent-type wrench. In one aspect outer surface 286 may also include grooves, slots, notches, holes, or other indentations adaptable to be engaged by a spanner-type wrench. Threads 277 may be any one of the threads mentioned above, but are typically 12 to 18 threads per inch UN threads.

Ring 272, ring 274, and ring 276 may be fabricated from any one or more the structural metals mentioned above, for example, carbon steel or stainless steel. Ring 272, ring 274, and ring 276 may be fabricated by machining from a billet or plate, by forging or casting and then finished machining, or fabricated by conventional powder metallurgy techniques. In one aspect, when formed by powder metallurgy, the material may be FC 0208, or its equivalent. Ring 272, ring 274, and ring 276 may also be surface hardened for example, induction hardened, carburized, or nitrided, among other surface hardening methods.

As shown in FIG. 17, according to one aspect of the invention, nut arrangement 270 may be used to secure bearing 16 to shaft 14 while also providing access to the surface of inner race 15 of bearing 16 whereby a bearing loading device may contact inner race 15. In one aspect, during a new installation or during servicing of an existing bearing, arrangement 270 permits access to inner race 15 by, for example, loading adapter 210. In an original installation, after bearing 16 is mounted to shaft 14 and hub 12, ring 272 may be threaded to shaft 14 and tightened, for example, hand tightened, against the exposed longitudinal surface of inner race 15. The bearing loading apparatus 244 may then be mounted to shaft 14 as described above, for example, where rod 40 is engaged with shaft 14 by means of collar 46, adapter 210 is mounted to rod 40 and inner race 15, and housing 52 (having piston 54) and nut 48 are mounted to rod 40. Then, according to aspects of the invention, a load may be applied to inner race 15, for example, mechanically by turning nut 48 and/or hydraulically by introducing a pressurized fluid to housing 52. The loading on inner race 15 may be monitored, for example, by means of pressure gauge 60, until the desired loading on inner race 15 is provided. After a load is applied to race 15, the hub assembly 12 may be rotated about shaft 14 to ensure proper seating of the rollers of bearing 16. This rotation and seating may be practiced repeatedly to ensure proper seating. According to aspects of the invention, with the desired loading on inner race 15 provided, ring or nut 272 may be tightened, for example, by using a spanner wrench engaging grooves 279, to maintain the desired loading on inner race 15.

In one aspect, the rollers in bearings 16 and 18 may be properly seated by applying a roller-seating load to the inner race 15, that is, a load sufficient to seat the rollers in bearings 16 and 18. For example, a roller-seating load may correspond to a hydraulic pressure in housing 52 of between about 900 to about 1000 psig, as detected by gauge 60. (In one aspect, this hydraulic pressure may correspond to a bearing load of between about 5000 pounds to about 6000 pounds, for example, as computed by Equation 1.) Again, hub 12 may be rotated one or more times while this seating load is applied to ensure proper seating of all the rollers. After proper seating of the rollers, the applied load may be reduced to a load corresponding to the desired preload on the bearings, for example, a load providing a few thousands inches preload. This desired preloading may be provided by between about 50 psig and 100 psig hydraulic pressure in housing 52 of means 244. (In one aspect, this hydraulic pressure may correspond to a bearing load of between about 300 pounds to about 600 pounds, for example, as computed by Equation 1.) Once the desired preload is provided, ring or nut 272 may be tightened, for example, by hand or with a tool, to maintain the desired preload.

Apparatus 244 is then removed, and ring 274 can be mounted to shaft 14 whereby at least one through hole 282 engages one or more pins 280 on ring 272 and key 284 engages keyway 285 in shaft 14. These interferences of ring 274 with ring 272 and shaft 14 substantially prohibit relative rotational motion between ring 272 and shaft 14 whereby the preload on inner race 15 is substantially maintained. Then, ring or jam nut 276 is threaded onto shaft 14 and tightened against ring 274 to secure ring 274 to shaft 14. Other procedures and procedural modifications of this method will be apparent to those of skill in the art.

In another aspect, the preloading on a bearing of an existing hub assembly may be verified or evaluated with the wheel in place or removed. In this aspect of the invention, nut arrangement 270 may be mounted to shaft 14 whereby a preload may or may not be present on inner race 15 of bearing 16. Third ring 276 and second ring 274 may be removed to obtain access to ring 272 whereby ring 272 may be rotated about shaft 14, if necessary. In one aspect, where sufficient play between hardware is provided, third ring 276 and second ring 274 need not be removed. Also, when a nut such as nut 220 in FIG. 11 is provided with a locking mechanism (for example, the locking mechanism disclosed in pending U.S. application Ser. No. 11/029,531), the locking mechanism need not be removed when sufficient play is available between hardware to detect loosening of the nut.

Apparatus 244 having rod 40, adapter 210, housing 52, and nut 48 may then be mounted whereby adapter 210 engages inner race 15. According to aspects of the invention, inner race 15 may be contacted by adapter 210 since the outer diameter of ring 272 is less than the outer diameter of inner race 15. The loading on inner race 15 is then gradually increased, either mechanically or hydraulically. At the same time or alternating with the increase in load, the tightness of ring 272 against inner race 15 may be checked, for example, manually, to determine when the preload on inner race 15 is relieved by the applied load via adapter 210. If nut or ring 272 becomes loose prior to achieving the desired preload for the specific bearing, the preload can be increased to the desired value, for example, as indicted by gauge 60, and then ring 272 tightened to maintain the desired preload. If the preload on inner race 15 is satisfactory, that is, ring 272 does not loosen until about the desired preload is achieved, nut or ring 272 can be tightened to maintain the desired preload. Should the actual preload exceed the desired preload, the load applied by apparatus 244 can be increased until ring or nut 272 becomes loose, and then the load reduced to the desired preload, and nut or ring 272 retightened to maintain the desired preload. Apparatus 244 may then be removed and rings 274 and 276 remounted according to the invention to ensure the desired preload is provided.

Again, the inventor underscores that though aspects of the present invention were described above with respect to their application to wheel hub assemblies, for example, truck wheel hub assemblies, it is understood that aspects of the present invention may be applied to any vehicle, machine, or component having at least one bearing.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:
1. An axle nut comprising;
   a cylindrical body having a first end comprising a circumferential slot receiving a retaining member;
   said cylindrical body having a plurality of engaging teeth;
   said retaining member secured to a keeper;
   said keeper having a plurality of keeper teeth engaging said plurality of engaging teeth to inhibit movement of said keeper relative to said body;
   said keeper having a radially inner side configured to engage a shaft to inhibit rotational movement of said body relative to the shaft;
   said retaining member engageable with said nut to hold said keeper axially such that said plurality of keeper teeth are engaged with said plurality of engaging teeth;
   said retaining member is formed of a material different than said keeper such that said retaining member is more flexible than said keeper; and
   a longitudinal axis, an outer surface engagable by a tool to rotate the axle nut, and a second end having means for bearing against a surface, the means for bearing against the surface comprising a face;
   a helically threaded through-hole directed substantially along the longitudinal axis of the cylindrical body of the axle nut to threadably engage an axle; and
   means for accessing an inner race of a bearing at the face of the second end of the body by an apparatus for applying a load to the bearing.

2. The nut as recited in claim 1, wherein the means for accessing comprises at least one recess.

3. The nut as recited in claim 2, wherein the at least one recess comprises a plurality of arcuate recesses equally spaced about the perimeter of the face.

4. The nut as recited in claim 2, wherein the at least one recess comprises a single annular recess extending around the perimeter of the face of the second end.

5. The nut as recited in claim 1 wherein the retaining member extends continuously in an arc from a first outside end to a second outside end, said keeper located between said first end and said second end.

6. The nut as recited in claim 1, wherein the nut comprises a bearing retaining nut and the surface comprises a surface of a bearing.

7. The nut as recited in claim 6, wherein the at least one recess is adapted to expose at least a portion of the surface of the bearing whereby a compressive load can be applied to the surface of the bearing.

8. The nut as recited in claim 2, wherein the at least one recess in the face of the second end comprises at least one cavity in the face of the second end.

9. The nut as recited in claim 8, wherein the at least one cavity comprises a plurality of evenly distributed cavities.

10. The nut as recited in claim 1, wherein the outer surface engagable by a tool comprises an outer surface engagable by one or more of a crescent wrench, a spanner wrench, and a socket.

11. The nut as recited in claim 1, wherein the nut is fabricated by powder metallurgy.

12. The nut as recited in claim 1, wherein the nut includes at least one surface that is surface hardened.

13. The nut as recited in claim 1, wherein the face comprises a surface.

14. An axle nut system comprising;
a cylindrical body having a first end, a longitudinal axis, an outer surface engagable by a tool to rotate the axle nut, and a second end having means for bearing against a surface, the means for bearing against the surface comprising a face;
said body having a plurality of engaging teeth;
a keeper having a plurality of keeper teeth engageable with said plurality of engaging teeth to inhibit movement of said keeper relative to said body when said plurality of engaging teeth engages said plurality of keeper teeth;
said keeper having a radially inner side configured to engage a shaft to inhibit rotational movement of said body relative to the shaft when said plurality of engaging teeth engages said plurality of keeper teeth and said radially inner side engages the shaft;
a separate keeper retaining member secured to said keeper, said retaining member engageable with said nut to hold said keeper axially such that said plurality of keeper teeth are engaged with said plurality of engaging teeth, said retaining member extending continuously in an arc from a first outside end to a second outside end, said keeper located between said first end and said second end; and
a helically threaded through-hole directed substantially along the longitudinal axis of the cylindrical body of the axle nut to threadably engage an axle.

15. An axle nut system comprising;
a cylindrical body having a first end, a longitudinal axis, an outer surface engagable by a tool to rotate the axle nut, and a second end having means for bearing against a surface, the means for bearing against the surface comprising a face;
said body having a plurality of engaging teeth;
a keeper having a plurality of keeper teeth engageable with said plurality of engaging teeth to inhibit movement of said keeper relative to said body when said plurality of engaging teeth engages said plurality of keeper teeth;
said keeper having a radially inner side configured to engage a shaft to inhibit rotational movement of said body relative to the shaft when said plurality of engaging teeth engages said plurality of keeper teeth and said radially inner side engages the shaft; and
a keeper retaining member connected to said keeper and engageable with said body to hold said keeper axially such that said plurality of keeper teeth are engaged with said plurality of engaging teeth, said retaining member being formed of a material different than said keeper such that said retaining member is more flexible than said keeper; and
a helically threaded through-hole directed substantially along the longitudinal axis of the cylindrical body of the axle nut to threadably engage an axle.

16. A lock nut system comprising:
a nut having a plurality of engaging teeth;
said nut having a cylindrical body and a helically threaded through-hole directed substantially along the longitudinal axis of the cylindrical body to threadably engage an axle;
a keeper having a plurality of keeper teeth engageable with said plurality of engaging teeth of said nut to inhibit movement of said keeper relative to said nut when said plurality of engaging teeth engages said plurality of keeper teeth;
said keeper having a radially inner side configured to engage a shaft to inhibit rotational movement of said nut relative to the shaft when said plurality of engaging teeth engages said plurality of keeper teeth and said radially inner side engages the shaft;
a keeper retaining member secured to said keeper, said retaining member engageable with said nut to hold said keeper axially such that said plurality of keeper teeth are engaged with said plurality of engaging teeth; and
at least one recess in a face of said nut, the at least one recess configured to expose at least a portion of a surface said nut bears against.

17. The system of claim 16, wherein said at least one recess comprises at least one arcuate recess.

18. The system of claim 16, wherein said at least one arcuate recess comprises a plurality of arcuate recesses equally spaced about the perimeter of a face of said nut.

19. The system of claim 16, wherein said at least one recess is bounded by a curved outer surface of said nut extending around a perimeter of said nut.

20. The system of claim 16, wherein said inner side of said keeper comprises a shaft engaging member engageable in a shaft slot of the shaft to inhibit rotational movement of said nut relative to the shaft.

21. The system of claim 16, wherein said nut further comprises a nut slot for receiving said keeper retaining member.

22. The system of claim 21, wherein said keeper retaining member comprises at least one leg configured to be received in said nut slot.

23. The system of claim 22 wherein said keeper retaining member is configured to hold said keeper axially relative to said nut such that said plurality of engaging teeth and said plurality of keeper teeth are engaged when said at least one leg is received in said nut slot.

24. The system of claim 23, wherein said at least one leg comprises two legs elastically deformable toward one another to allow said retaining member to be attached to said nut by inserting said two legs in said nut slot.

25. The system of claim 16, wherein said retaining member is formed of a material different than said keeper, such that said retaining member is more flexible than said keeper.

26. The system of claim 16, wherein said retaining member extends continuously in an arc from a first outside end to a second outside end, said keeper located between said first end and said second end.

* * * * *